(12) United States Patent
Ly et al.

(10) Patent No.: US 11,224,002 B2
(45) Date of Patent: *Jan. 11, 2022

(54) MULTI-CELL NOTIFICATION ZONE SINGLE FREQUENCY NETWORK

(71) Applicant: QUALCOMM Incorporated, San Diego, CA (US)

(72) Inventors: Hung Dinh Ly, San Diego, CA (US); Heechoon Lee, San Diego, CA (US); Tingfang Ji, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/510,400

(22) Filed: Jul. 12, 2019

(65) Prior Publication Data

US 2020/0022068 A1 Jan. 16, 2020

Related U.S. Application Data

(60) Provisional application No. 62/698,492, filed on Jul. 16, 2018.

(51) Int. Cl.
*H04W 4/00* (2018.01)
*H04W 48/10* (2009.01)
(Continued)

(52) U.S. Cl.
CPC ......... *H04W 48/10* (2013.01); *H04J 11/0073* (2013.01); *H04J 11/0076* (2013.01); *H04W 24/08* (2013.01)

(58) Field of Classification Search
CPC ..... H04W 48/10; H04W 24/08; H04W 76/27; H04W 72/00; H04J 11/0073; H04J 11/0076
See application file for complete search history.

(56) References Cited

U.S. PATENT DOCUMENTS

RE44,335 E * 7/2013 Park .............................. 375/259
2014/0226638 A1* 8/2014 Xu ........................ H04W 72/042
370/336

(Continued)

OTHER PUBLICATIONS

"3rd Generation Partnership Project, Technical Specification Group Radio Access Network, NR, Radio Resource Control (RRC) protocol specification (Release 15)", 3GPP Draft, 38331-F21. 3rd Generation Partnership Project (3GPP), Mobile Competence Centre, 650, Route Des Lucioles, F-06921 Sophia-Antipolis Cedex, France, Jun. 21, 2018 (Jun. 21, 2018), XP051519424, 281 Pages, Retrieved from the Internet:URL:http://www.3gpp.org/ftp/tsg%5Fran/WG2%5FRL2/Specifications/201806%5Ffinal%5Fspecs%5Fafter%5FRAN%5F80/38331%2Df21%2Ezip [retrieved on Jun. 21, 2018] paragraph 5.2.1 paragraph 5.2.2 paragraph 5.5.1 paragraph 5.5.2.10 paragraph 5.5.3.1 p. 122-p. 126 p. 109-p. 110.

(Continued)

*Primary Examiner* — Abdelnabi O Musa
(74) *Attorney, Agent, or Firm* — Holland & Hart LLP

(57) ABSTRACT

Methods, systems, and devices for wireless communications are described. A user equipment (UE) may operate in a radio resource control (RRC) inactive state of a discontinuous reception (DRX) mode. The UE may identify, based at least in part on the UE operating in the RRC inactive state, a single frequency network (SFN) for a notification zone that is configured for the UE, the notification zone comprising a plurality of cells. The UE may receive one or more synchronization signal blocks (SSBs) broadcast by the plurality of cells over the SFN. The UE may perform a channel measurement procedure based at least in part on the one or more SSBs received over the SFN.

21 Claims, 22 Drawing Sheets

(51) Int. Cl.
*H04W 24/08* (2009.01)
*H04J 11/00* (2006.01)

(56) References Cited

U.S. PATENT DOCUMENTS

| | | | |
|---|---|---|---|
| 2016/0316444 A1* | 10/2016 | Ringh | H04L 5/0048 |
| 2017/0048821 A1* | 2/2017 | Xu | H04L 1/0013 |
| 2018/0091968 A1 | 3/2018 | Ly et al. | |
| 2018/0262313 A1* | 9/2018 | Nam | H04W 72/0446 |
| 2018/0270895 A1* | 9/2018 | Park | H04W 76/38 |
| 2019/0053029 A1* | 2/2019 | Agiwal | H04W 76/27 |
| 2019/0394082 A1* | 12/2019 | Cirik | H04L 5/0048 |
| 2020/0022041 A1 | 1/2020 | Ly et al. | |
| 2020/0036430 A1* | 1/2020 | Kim | H04W 72/14 |
| 2020/0252890 A1* | 8/2020 | Irukulapati | H04W 72/005 |

OTHER PUBLICATIONS

"3rd Generation Partnership Project; Technical Specification Group Radio Access Network; NR; Physical layer procedures for control (Release 15)", 3GPP Standard; Technical Specification; 3GPP TS 38.213, 3rd Generation Partnership Project (3GPP), Mobile Competence Centre ; 650, Route Des Lucioles ; F-06921 Sophia-Antipolis Cedex ; France, vol. RAN WG1, No. V15.2.0, Jun. 29, 2018 (Jun. 29, 2018), pp. 1-99, XP051474490, [retrieved on Jun. 29, 2018], section 8.1; pp. 32-33, table 8.1_1, section 10-10.1; p. 66-p. 69; tables 10.1-1.
International Search Report and Written Opinion—PCT/US2019/041854—ISA/EPO—dated Oct. 11, 2019.

\* cited by examiner

MULTI-CELL NOTIFICATION ZONE SINGLE FREQUENCY NETWORK

CROSS REFERENCE

The present Application for patent claims the benefit of U.S. Provisional Patent Application No. 62/698,492 by L Y, et al., entitled "MULTI-CELL NOTIFICATION ZONE SINGLE FREQUENCY NETWORK," filed Jul. 16, 2018, assigned to the assignee hereof, and expressly incorporated herein.

BACKGROUND

The following relates generally to wireless communications, and more specifically to multi-cell notification zone single frequency network (SFN).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

In some aspects, wireless communication systems may include UEs operating in a discontinuous reception (DRX) mode. For example, a UE may be in an idle state where functions, components, processes, and the like, of the UE are turned off to conserve power and/or for an initial access procedure. In some aspects, the UE may be in an inactive state, e.g., in RRC inactive state, where the UE is not performing ongoing communications, but maintains an updated association with the network, e.g., current access stratum (AS) context. For example, the UE specific DRX may be configured by upper layers and/or by an RRC layer. As another example, the UE may be operating in an RRC connected or active state for ongoing communications, e.g., for communicating control and/or data information. However, DRX operations may be difficult in some wireless networks, such as a mmW wireless network, where the base station typically is configured to use beam sweeping operations for paging and other signaling for a UE. This may result in wasted resources, e.g., over the air resources and/or increased overhead.

SUMMARY

The described techniques relate to improved methods, systems, devices, and apparatuses that support a multi-cell notification zone single frequency network (SFN). Generally, the described techniques provide a mechanism for a UE to use synchronization signals from a SFN notification zone to support hierarchical mobility. For example, the UE may be operating in a discontinuous reception (DRX) mode in a wireless network. In some aspects, the UE may be operating in a radio resource control (RRC) active or inactive state of the DRX mode. In some aspects, the network may configure an SFN for the UE based on the UE operating in the RRC active or inactive state of the DRX mode. Generally, the SFN may include a plurality of cells that are located proximate to the UE, e.g., within the notification zone, and are configured the transmit signals to the UE over the SFN. In some aspects, the signals may include synchronization signals, such as a synchronization signal block (SSB), e.g., primary synchronization signals (PSS), secondary synchronization signals (SSSs), physical broadcast channel (PBCH) signals, and/or a signal carrying or otherwise indicating a notification zone identification. Accordingly, the UE may identify the SFN for the notification zone based on the UE operating in the RRC active or inactive state of the DRX mode. The UE may receive the signal(s) (e.g., SSBs) broadcast by one or more of the cells within the notification zone over the SFN and perform a channel measurement procedure based on the received signal(s). The UE may transmit the feedback information to one or more of the cells within the notification zone and/or use the results of the channel measurement procedure to maintain a current connection to the cells, e.g., timing synchronization/tracking, acceptable channel performance metrics, frequency tracking, etc.

A method of wireless communication at a UE is described. The method may include operating in a RRC inactive state of a DRX mode, identifying, based on the UE operating in the RRC inactive state, a SFN for a notification zone that is configured for the UE, the notification zone including a set of cells, receiving one or more SSBs broadcast by the set of cells over the SFN, and performing a channel measurement procedure based on the one or more SSBs received over the SFN.

An apparatus for wireless communication at a UE is described. The apparatus may include a processor, memory in electronic communication with the processor, and instructions stored in the memory. The instructions may be executable by the processor to cause the apparatus to operate in a RRC inactive state of a DRX mode, identify, based on the UE operating in the RRC inactive state, a SFN for a notification zone that is configured for the UE, the notification zone including a set of cells, receive one or more SSBs broadcast by the set of cells over the SFN, and perform a channel measurement procedure based on the one or more SSBs received over the SFN.

Another apparatus for wireless communication at a UE is described. The apparatus may include means for operating in a RRC inactive state of a DRX mode, identifying, based on the UE operating in the RRC inactive state, a SFN for a notification zone that is configured for the UE, the notification zone including a set of cells, receiving one or more SSBs broadcast by the set of cells over the SFN, and performing a channel measurement procedure based on the one or more SSBs received over the SFN.

A non-transitory computer-readable medium storing code for wireless communication at a UE is described. The code may include instructions executable by a processor to operate in a RRC inactive state of a DRX mode, identify, based on the UE operating in the RRC inactive state, a SFN for a notification zone that is configured for the UE, the notification zone including a set of cells, receive one or more SSBs broadcast by the set of cells over the SFN, and perform a channel measurement procedure based on the one or more SSBs received over the SFN.

Some examples of the method, apparatuses, and non-transitory computer-readable medium described herein may further include operations, features, means, or instructions for receiving a set of SSBs within a transmission occasion, where the channel measurement procedure may be based on the set of SSBs received within the transmission occasion.

Some examples of the method, apparatuses, and non-transitory computer-readable medium described herein may further include operations, features, means, or instructions for receiving the one or more SSBs over a set of transmission occasions, where the channel measurement procedure may be based on the one or more SSBs received over the set of transmission occasions.

Some examples of the method, apparatuses, and non-transitory computer-readable medium described herein may further include operations, features, means, or instructions for updating one or more of a timing tracking function, or a frequency tracking function, or a combination thereof, based on the one or more SSBs broadcast by the cells within the notification zone.

Some examples of the method, apparatuses, and non-transitory computer-readable medium described herein may further include operations, features, means, or instructions for receiving a signal carrying configuration of SSBs broadcast by the cells in the notification zone.

In some examples of the method, apparatuses, and non-transitory computer-readable medium described herein, the signal includes a system information signal, or a RRC message, or a combination thereof.

In some examples of the method, apparatuses, and non-transitory computer-readable medium described herein, the signal indicates one or more of a frequency parameter for the SFN, or a time parameter for transmission of the one or more SSBs, or a periodicity parameter for transmission of the one or more SSBs, or a numerology parameter for the one or more SSBs, or a combination thereof.

Some examples of the method, apparatuses, and non-transitory computer-readable medium described herein may further include operations, features, means, or instructions for transmitting a first signal indicating that the UE supports the SFN for the notification zone.

Some examples of the method, apparatuses, and non-transitory computer-readable medium described herein may further include operations, features, means, or instructions for receiving, based on the first signal, a second signal indicating that the SFN for the notification zone may be configured for the UE.

Some examples of the method, apparatuses, and non-transitory computer-readable medium described herein may further include operations, features, means, or instructions for receiving a signal indicating that a network entity supports the SFN for the notification zone.

Some examples of the method, apparatuses, and non-transitory computer-readable medium described herein may further include operations, features, means, or instructions for receiving one or more cell-specific SSBs from one or more cells of the set of cells.

Some examples of the method, apparatuses, and non-transitory computer-readable medium described herein may further include operations, features, means, or instructions for identifying a resource mapping identifying resources for the one or more SSBs broadcast over the SFN and resources for the one or more cell-specific SSBs.

In some examples of the method, apparatuses, and non-transitory computer-readable medium described herein, the resource mapping includes a cell-specific bitmap.

Some examples of the method, apparatuses, and non-transitory computer-readable medium described herein may further include operations, features, means, or instructions for decoding the SSS to determine an identifier for the notification zone.

In some examples of the method, apparatuses, and non-transitory computer-readable medium described herein, a PSS associated with the SSS includes a defined identifier that may be different from the identifier for the notification zone.

Some examples of the method, apparatuses, and non-transitory computer-readable medium described herein may further include operations, features, means, or instructions for decoding the PSS and the SSS to determine an identifier for the notification zone.

In some examples of the method, apparatuses, and non-transitory computer-readable medium described herein, the one or more SSBs may be received on a non-synchronized raster with respect to one or more cell-specific SSBs from the set of cells.

Some examples of the method, apparatuses, and non-transitory computer-readable medium described herein may further include operations, features, means, or instructions for identifying a number associated with the one or more SSBs based on a number associated with one or more cell-specific SSBs for the set of cells, on a configuration signal received by the UE, or on a number associated with a notification zone SFN paging occasion.

Some examples of the method, apparatuses, and non-transitory computer-readable medium described herein may further include operations, features, means, or instructions for identifying a periodicity associated with the one or more SSBs based on a periodicity associated with one or more cell-specific SSBs for the set of cells or on a configuration signal received by the UE.

In some examples of the method, apparatuses, and non-transitory computer-readable medium described herein, the one or more SSBs include one or more of a PSS, or a SSS, or a PBCH signal, or a combination thereof.

In some examples of the method, apparatuses, and non-transitory computer-readable medium described herein, the channel measurement procedure may be used to identify a channel performance metric indicating one or more of a received signal strength indicator (RSSI), a reference signal received quality (RSRQ), a reference signal received power (RSRP), a SNR, a signal-plus-interference-to-noise ratio (SINR), a throughput, an error rate, or combinations thereof.

In some examples of the method, apparatuses, and non-transitory computer-readable medium described herein, the one or more SSBs include a PBCH signal indicating notification zone specific configuration information.

A method of wireless communication at a base station is described. The method may include transmitting one or more cell-specific SSBs to a UE, determining that the base station is a part of a SFN for a notification zone configured for the UE, and transmitting one or more SSBS to the UE over the SFN for the notification zone.

An apparatus for wireless communication at a base station is described. The apparatus may include a processor, memory in electronic communication with the processor, and instructions stored in the memory. The instructions may be executable by the processor to cause the apparatus to transmit one or more cell-specific SSBs to a UE, determine that the base station is a part of a SFN for a notification zone configured for the UE, and transmit one or more SSBS to the UE over the SFN for the notification zone.

Another apparatus for wireless communication at a base station is described. The apparatus may include means for transmitting one or more cell-specific SSBs to a UE, determining that the base station is a part of a SFN for a notification zone configured for the UE, and transmitting one or more SSBS to the UE over the SFN for the notification zone.

A non-transitory computer-readable medium storing code for wireless communication at a base station is described. The code may include instructions executable by a processor to transmit one or more cell-specific SSBs to a UE, determine that the base station is a part of a SFN for a notification zone configured for the UE, and transmit one or more SSBS to the UE over the SFN for the notification zone.

Some examples of the method, apparatuses, and non-transitory computer-readable medium described herein may further include operations, features, means, or instructions for transmitting, over the SFN, a set of SSBs within a transmission occasion.

Some examples of the method, apparatuses, and non-transitory computer-readable medium described herein may further include operations, features, means, or instructions for transmitting, over the SFN, one or more SSBs over a set of transmission occasions.

Some examples of the method, apparatuses, and non-transitory computer-readable medium described herein may further include operations, features, means, or instructions for transmitting a signal to the UE identifying the SFN for the notification zone.

In some examples of the method, apparatuses, and non-transitory computer-readable medium described herein, the signal indicates one or more of a frequency parameter for the SFN, or a time parameter for transmission of the one or more SSBs, or a periodicity parameter for transmission of the one or more SSBs, or a numerology parameter for the one or more SSBs, or a combination thereof.

Some examples of the method, apparatuses, and non-transitory computer-readable medium described herein may further include operations, features, means, or instructions for receiving a first signal indicating that the UE supports the SFN for the notification zone.

Some examples of the method, apparatuses, and non-transitory computer-readable medium described herein may further include operations, features, means, or instructions for transmitting, based on the first signal, a second signal indicating that the SFN for the notification zone may be configured for the UE.

Some examples of the method, apparatuses, and non-transitory computer-readable medium described herein may further include operations, features, means, or instructions for transmitting a second signal indicating support for the SFN for the notification zone.

Some examples of the method, apparatuses, and non-transitory computer-readable medium described herein may further include operations, features, means, or instructions for transmitting a resource mapping to the UE identifying resources for the one or more SSBs broadcast over the SFN and resources for the one or more cell-specific SSBs.

In some examples of the method, apparatuses, and non-transitory computer-readable medium described herein, the resource mapping identifies resource for the one or more SSBs broadcast over the SFN that at least partially overlap with the resource for the one or more cell-specific SSBs.

Some examples of the method, apparatuses, and non-transitory computer-readable medium described herein may further include operations, features, means, or instructions for wherein the resource mapping identifies resource for the one or more SSBs broadcast over the SFN that do not overlap with the resource for the one or more cell-specific SSBs.

Some examples of the method, apparatuses, and non-transitory computer-readable medium described herein may further include operations, features, means, or instructions for encoding the SSS to convey an indication of an identifier for the notification zone.

Some examples of the method, apparatuses, and non-transitory computer-readable medium described herein may further include operations, features, means, or instructions for configuring a PSS associated with the SSS to indicate a defined identifier that may be different from the identifier for the notification zone.

Some examples of the method, apparatuses, and non-transitory computer-readable medium described herein may further include operations, features, means, or instructions for encoding the PSS and the SSS to convey an indication of an identifier for the notification zone.

Some examples of the method, apparatuses, and non-transitory computer-readable medium described herein may further include operations, features, means, or instructions for transmitting the one or more SSBs broadcast over the network using a same waveform as may be used for the one or more cell-specific SSBs.

Some examples of the method, apparatuses, and non-transitory computer-readable medium described herein may further include operations, features, means, or instructions for transmitting the one or more SSBs broadcast over the network using a different waveform as may be used for the one or more cell-specific SSBs.

In some examples of the method, apparatuses, and non-transitory computer-readable medium described herein, the one or more SSBs may be transmitted on a non-synchronized raster with respect to the one or more cell-specific SSBs.

Some examples of the method, apparatuses, and non-transitory computer-readable medium described herein may further include operations, features, means, or instructions for identifying a number associated with the one or more SSBs based on a number associated with the one or more cell-specific SSBs, on a configuration signal transmitted to the UE, or on a number associated with a notification zone SFN paging occasion.

Some examples of the method, apparatuses, and non-transitory computer-readable medium described herein may further include operations, features, means, or instructions for identifying a periodicity associated with the one or more SSBs based on a periodicity associated with the one or more cell-specific SSBs or on a configuration signal transmitted to the UE.

In some examples of the method, apparatuses, and non-transitory computer-readable medium described herein, the one or more SSBs include one or more of a PSS, a SSS, or a PBCH signal.

Some examples of the method, apparatuses, and non-transitory computer-readable medium described herein may further include operations, features, means, or instructions for determining that the UE may be operating in a RRC inactive state of a DRX mode and configuring, based on the UE operating in the RRC inactive state, the SFN for the UE for the notification zone, the notification zone including a set of cells.

In some examples of the method, apparatuses, and non-transitory computer-readable medium described herein, the one or more SSBs include a PBCH signal indicating notification zone specific configuration information.

DETAILED DESCRIPTION

Figure 1:
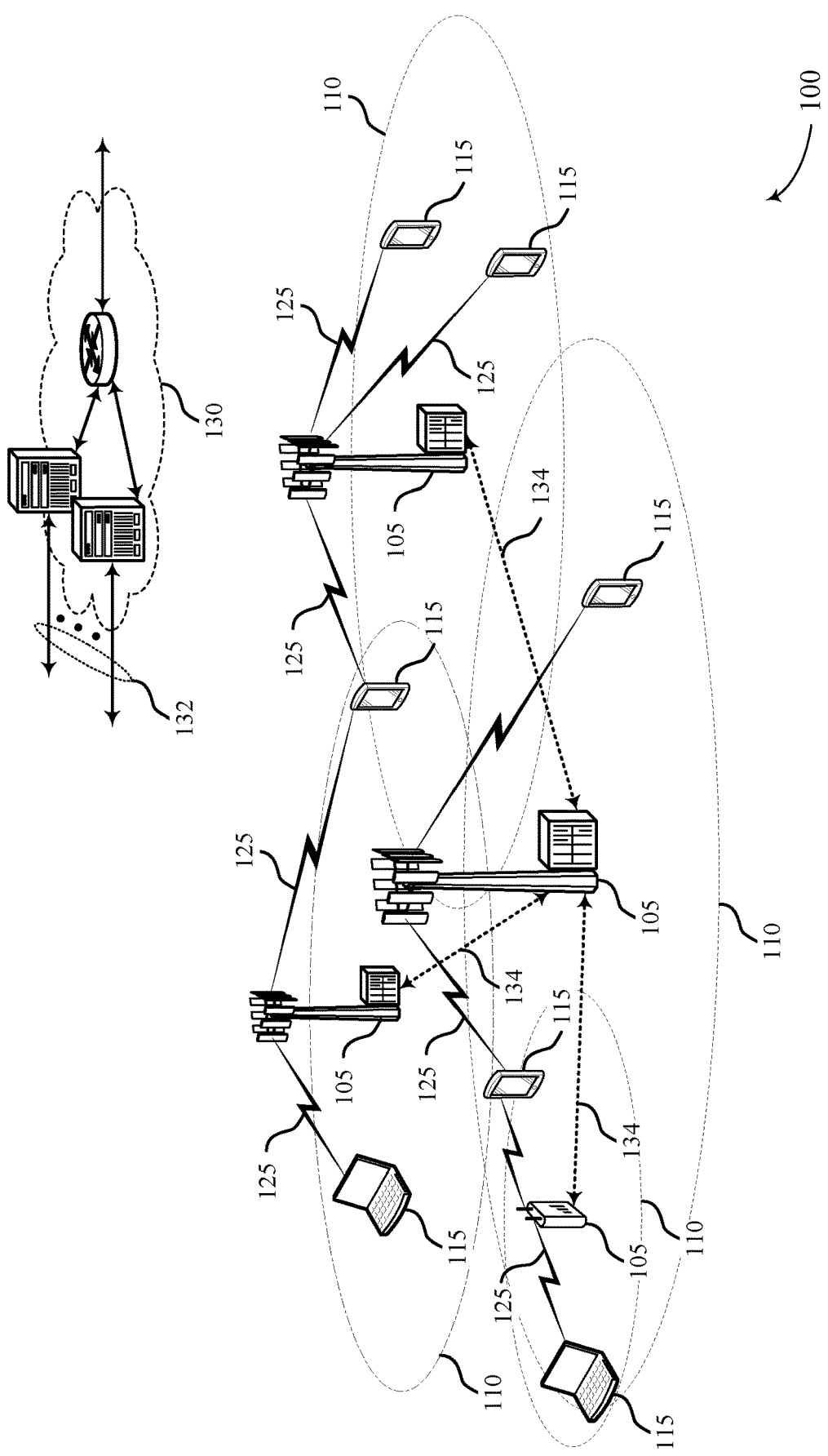
FIG. 1 illustrates an example of a system for wireless communications that supports multi-cell notification zone single frequency network (SFN) in accordance with aspects of the present disclosure.

Some wireless communication systems may operate in millimeter wave (mmW) frequency ranges (e.g., 28 GHz, 40 GHz, 60 GHz, etc.). In some cases, wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device may select an active beam for communicating with a network by selecting the strongest beam from among a number of candidate beams.

In some aspects, wireless communication systems may be configured for a user equipment (UE) to operate in a discontinuous reception (DRX) mode. For example, the UE may operate in a radio resource control (RRC) connected state for active communications. The UE may operate in an RRC inactive state, where the UE maintains some context with respect to the non-access stratum (NAS). In some aspects, the UE may operate in an RRC idle state of the DRX mode, e.g., for no active communications, initial access, and the like. In some aspects, the DRX mode may be inefficient and/or ineffective in terms of supporting the UE while operating in various states of the DRX mode.

Aspects of the disclosure are initially described in the context of a wireless communication system. In some aspects, the described techniques introduce a single frequency network (SFN) synchronization signal (SS) for a notification zone. In some aspects, the SFN for the notification zone may operate as a reference signal for a UE to support hierarchical mobility procedures and/or time/frequency tracking. For example, the UE may be operating in an RRC active or inactive state of the DRX mode. The network may configure the SFN for the notification zone of the UE, which includes a plurality of cells (e.g., base stations) located within the notification zone. The UE may identify the SFN for the notification zone and receive one or more synchronization signal blocks (SSBs) that are broadcast by the cells within the notification zone. For example, each cell within the notification zone may broadcast SSBs over the SFN in an omni-directional broadcast, and/or a directional broadcast. The UE may receive the SSBs broadcast over the SFN and perform a channel measurement procedure based on the SSBs. For example, the UE may use the SSBs broadcast over the SFN to determine a reference signal received quality (RSRQ), a received signal strength indicator (RSSI), and the like, for the received SSBs. In some aspects, the UE may use the SSB broadcast over the SFN for timing correction, frequency tracking, and the like. Accordingly, the SFN for the notification zone provides a rapid and easily monitored network by which the UE operating in the RRC inactive state of the DRX mode ensures an up-to-date access stratum context information.

Aspects of the disclosure are further illustrated by and described with reference to apparatus diagrams, system diagrams, and flowcharts that relate to multi-cell notification zone SFN.

FIG. 1 illustrates an example of a wireless communications system 100 that supports multi-cell notification zone SFN in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a UE 115 may operate in a RRC inactive state of a DRX mode. The UE 115 may identify, based at least in part on the UE 115 operating in the RRC inactive state, a SFN for a notification zone that is configured for the UE 115, the notification zone comprising a plurality of cells (e.g., base stations 105). The UE 115 may receive one or more SSBs broadcast by the plurality of cells over the SFN. The UE 115 may perform a channel measurement procedure based at least in part on the one or more SSBs received over the SFN.

In some aspects, a network entity (such as one or more functions operating within core network 130) may determine that a UE 115 is operating in a RRC inactive state of a DRX mode. The network entity may configure, based at least in part on the UE 115 operating in the RRC inactive state, a SFN for the UE 115 for a notification zone, the notification zone comprising a plurality of cells. The network entity may transmit, e.g., via a serving base station 105 and/or one or more cells within the notification zone, a signal to the UE 115 identifying the SFN for the notification zone. For ease of reference, aspects of the functionalities performed by the network entity will be describes as being performed by a base station 105.

In some aspects, a base station 105 may transmitting one or more cell-specific SSBs to a UE 115. The base station 105 may determine that the base station 105 is a part of a SFN for a notification zone configured for the UE 115. The base station 105 may transmit one or more SSBS to the UE 115 over the SFN for the notification zone.

Figure 2:
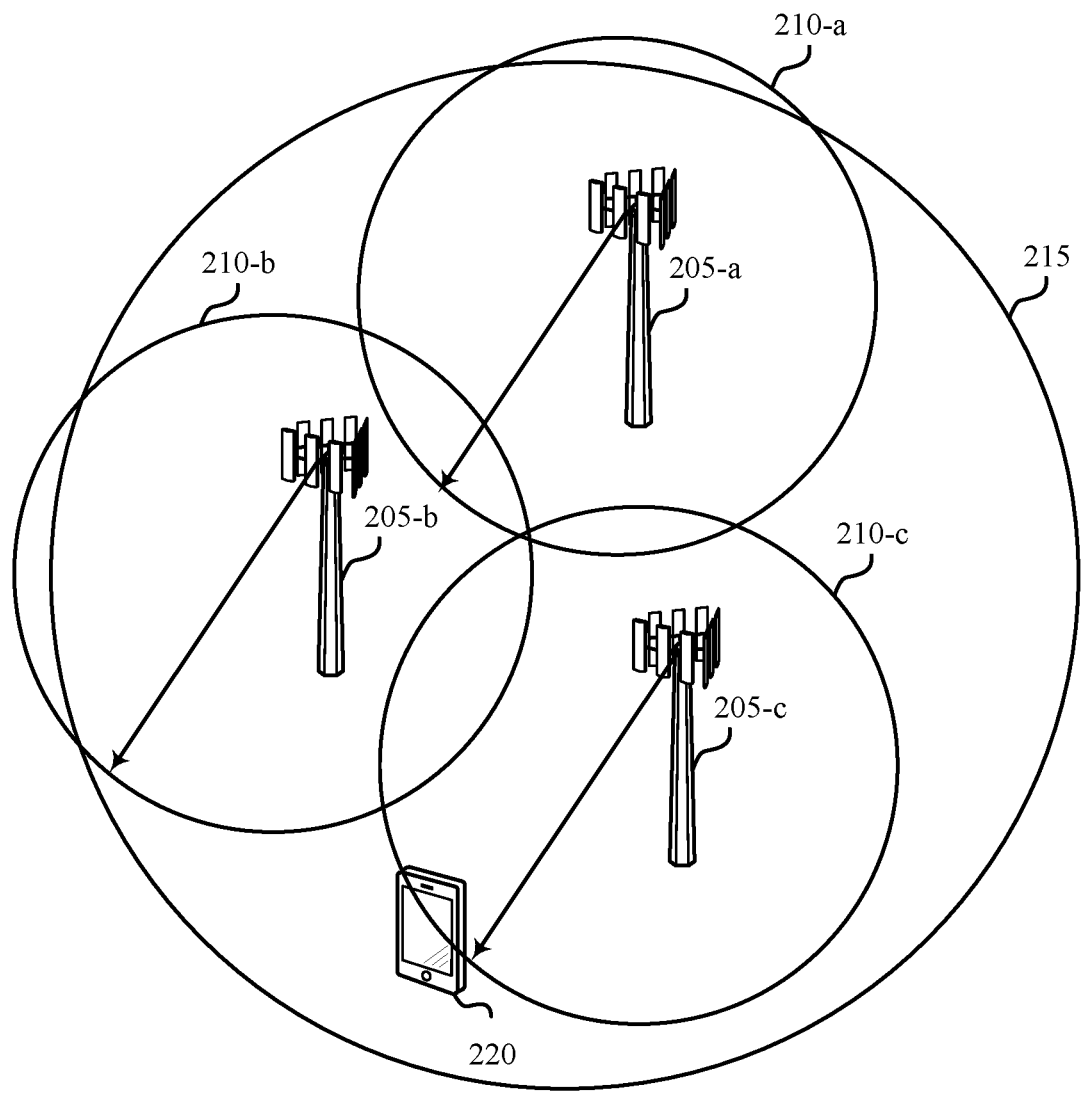
FIG. 2 illustrates an example of a wireless communication system that supports multi-cell notification zone SFN in accordance with aspects of the present disclosure.

FIG. 2 illustrates an example of a wireless communication system 200 that supports multi-cell notification zone SFN in accordance with aspects of the present disclosure. In some examples, wireless communication system 200 may implement aspects of wireless communication system 100. Wireless communication system 200 may include a plurality of base stations 205 (with three being shown by way of example only) and a UE 220, which may be examples of the corresponding devices described herein. In some aspects, wireless communication system 200 may be a SFN configured for notification zone 215. In some aspects, the functionalities described with respect to the base stations 205 may refer to functionalities performed by a network entity, such as one or more functions of a core network.

In some aspects, UE 220 may be operating in an RRC active or inactive state of a DRX mode. Based at least in part on UE 220 operating in the RRC active or inactive state of the DRX mode, a network entity may configure a SFN for UE 220. In some aspects, an SFN may refer to a broadcast network where several transmitters (e.g., a plurality of cells, such as base stations 205) simultaneously send the same signal over the same frequency channel to UE 220. For example, each of the base stations 205, e.g., cells, may form the SFN for the notification zone 215 that is configured for UE 220. In some aspects, the size of the notification zone 215 and/or number of base stations 205 included in the notification zone 215 may be selected based on the mobility of the UE 220, on the size of the coverage area 210 associated with each respective base station 205, the location of UE 220 within the notification zone 215, on historical information associated with UE 220 (e.g., historical mobility patterns), and/or on projected information associated with UE 220 (e.g., based on a forecasted mobility of the UE 220).

Accordingly, the notification zone 215 can have more or fewer base stations 205. In some aspects, the notification zone 215 may also be referred to as a radio access network (RAN)-based notification area (RNA). In some aspects, the notification zone 215 may cover a smaller geographical area than a tracking area configured for the UE 220. For example, in some aspects the base stations 205 of the notification zone 215 may be a subset of base stations forming a tracking area for the UE 220.

In some aspects, a network entity may configure the SFN for the notification zone 215 based on support for SFN operations within the notification zone 215. For example, the UE 220 may transmit a signal to the network entity that indicates that the UE 220 supports SFN operations within a notification zone. Accordingly, the network entity may transmit a second signal to the UE 220 that indicates or otherwise identifies that the SFN for the notification zone 215 has been configured for the UE 220. In other aspects, the network entity may simply transmit a signal indicating support for the SFN operations for the notification zone 215, e.g., may convey an indication that the network supports SFN operations for notification zone.

In some aspects, the network entity may notify UE 220 of the SFN configured for the notification zone 215. For example, the network entity may transmit a signal (e.g., via the serving base station 205 of UE 220 during the DRX mode configuration and/or via one or more base stations 205 broadcast over the SFN) to UE 220 that identifies the SFN for the notification zone 215. For example, the signal may identify or otherwise convey an indication of a frequency parameter for the SFN, a time parameter for transmission of SSBs, a periodicity parameter for transmission of the SSBs, and/or a numerology parameter for the SSBs. In some aspects, the signal may include a system information signal and/or a RRC message.

In some aspects, one or any combination of the following information for the one or more SSBs broadcast over the SFN for notification zone 215 may be signaled to UE 220, e.g., signaled via system information or RRC message. In some aspects, this may include a frequency location (e.g., absolute radio frequency channel number (ARFCN)). In some aspects, this may include a time location (e.g., offset relative to a reference time, such as subframe number #0 of the serving cell). In some aspects, this may include a notification zone 215 SSB periodicity. In some aspects, this may include a notification zone 215 SSB numerology.

In some aspects, this may include a mapping between the one or more SSBs broadcast over the SFN of the notification zone 215 and cell specific SSB(s) transmitted by the individual cells within the notification zone 215. In some aspects, this may include the one or more SSBs broadcast over the SFN being mapped to potential location(s) (e.g., time and/or frequency locations) of cell specific SSBs, e.g., when there are locations available. When there are no locations available, the one or more SSBs broadcast over the SFN may be mapped to locations outside of the locations (e.g., to other time and/or frequency resources) used for the cell specific SSBs. When receiving broadcast channels, such as PDCCH/PDSCH for SIB1, PDCCH/PDSCH for paging, and/or other system information blocks, UEs may assume that no SSBs are broadcast over the SFN within the configured resources of such broadcast channels. In some aspects, when one or more SSBs broadcast over the SFN are mapped to potential locations of the cell specific SSBs, their actual locations may be signaled to the UE 220 as a part of an indication for an actually transmitted cell-specific SSB bitmap.

In some examples, the one or more SSBs broadcast over the SFN may collide with the cell-specific SSBs. In some aspects, the network entity may schedule (e.g., map) the one or more SSBs broadcast over the SFN to avoid any such collision. In some aspects, this may include one more SSBs broadcast over the SFN puncturing one or more resource elements that contain the cell specific SSBs. In some aspects, this may include none of the one or more SSBs broadcast over the SFN of the notification zone 215 being transmitted during a transmission occasion where they collide with at least K resource elements containing the cell specific SSBs.

In some aspects, the one or more SSBs broadcast over the SFN may simply include a secondary synchronization signal (SSS). In other aspects, the one or more SSBs may include a primary synchronization signal (PSS) and the SSS. In other aspects, the one or more SSBs may include a PSS, and SSS, and a physical broadcast channel (PBCH) signal transmitted by the base stations 205 over the SFN for the notification zone 215. That is, in some aspects the notification zone 215 SSBs may include SSS only or PSS/SSS only or PSS/SSS/PBCH. When the SSBs broadcast over the SFN include PBCH signals, the PBCH signal may carry or otherwise convey an indication of notification zone-specific system information, e.g., control resource set information, PDCCH search space configuration for paging PDCCH over the notification zone 215, and the like. In the instance where the notification zone 215 SSBs include PSS/SSS, the waveform for the SSBs may be identical to the cell-specific SSBs waveform (e.g., PSS/SSS waveform), or may use a different waveform than the cell-specific SSBs waveform. In some aspects where the notification zone 215 SSBs include both PSS and SSS, an identifier for the notification zone 215 may be conveyed or otherwise indicated via the notification zone 215 PSS/SSS. This may be different from a cell specific SSBs (e.g., cell specific PSS/SSS) where the cell identifier is conveyed through a cell-specific PSS/SSS. In some aspects, the notification zone 215 SSBs broadcast over the SFN may be transmitted in an omni-directional transmission and/or in a directional transmission using one or more beams. In some aspects, each base station 205 of the notification zone 215 may broadcast their respective SSBs over the SFN at the same time.

When the notification zone 215 SSBs includes only the SSS, a notification zone 215 identifier may be conveyed through the notification zone 215 SSS. In this instance, an identifier conveyed in the PSS that is associated with the SSS may be a predefined value, e.g., a fixed 0 or 1 or 2, used when computing the notification zone 215 identifier.

In some aspects, the numerology for the SSB broadcast by the base stations 205 over the SFN of the notification zone 215 may be based on different options. In a first option, the numerology for the SSBs may be the same as the numerology used for cell specific SSBs (e.g. cell specific SS) numerology. In a second option, the numerology for the SSB broadcast over the SFN may be configured for UE 220, e.g., in a system information signal and/or in a RRC message. In third option, the numerology for the SSBs broadcast over the SFN may be the same as a numerology used for a notification zone 215 SFN paging occasion.

In some aspects, the periodicity for the SSBs broadcast over the SFN by the base stations 205 may also be based on different options. In a first option, the SSBs broadcast over the SFN may be broadcast using the same periodicity as cell specific SSBs, which may be signaled in system information. In another option, the periodicity may be configured as part of the notification zone 215 SFN configuration. In some aspects, the SSBs may be transmitted over one or more transmission occasions. For example, one or more SSBs may be transmitted within each transmission occasion and/or an SSB may be transmitted during a transmission occasion. Other options may also be considered.

In some aspects, the SSBs may be broadcast over the SFN using a defined antenna port and/or quasi co-location (QCL) configuration. As one example, the signals and/or channels used for the notification zone 215 SSBs may be transmitted over the same antenna ports/QCL configuration and/or different antenna ports/QCL configurations. In some aspects, the SSBs broadcast over the SFN may be transmitted over different antenna ports than are used for cell specific SSBs. In some aspects, there may be no QCL between the notification zone 215 SSBs and cell specific SSBs broadcast by the base stations 205 within the notification zone 215.

Thus, the base stations 205 within the notification zone 215 may additionally transmit cell specific SSBs, which are different than, at least in some aspects, the one or more SSBs broadcast over the SFN for the notification zone 215. That is, UE 220 may also receive one or more cell specific SSBs from one or more cells of the plurality of cells (e.g., at least one base station 205 of the plurality of base stations 205) of the notification zone 215. For example, the notification zone 215 SSBs may be received on the same or on a different frequency than the cell specific SSBs, at the same time or at a different time than the cell specific SSBs, and the like. In some aspects, the notification zone 215 SSBs may be received on a non-synchronized raster with respect to the cell specific SSBs.

Accordingly, the base stations 205 of the notification zone 215 may transmit cell-specific SSBs as well as the one or more SSBs broadcast over the SFN for the notification zone 215. The one or more SSBs broadcast over the SFN for the notification zone 215 may use some, all, or none of the resources used for the cell-specific SSBs.

In some aspects, the UE 220 may monitor the SFN for the notification zone 215 while operating in the RRC inactive state of the DRX mode. Accordingly, UE 220 may receive one or more SSBs broadcast by the plurality of cells (e.g., base stations 205-a, 205-b, and/or 205-c) over the SFN and perform a channel measurement procedure based at least in part on the received SSBs. Generally, the channel measurement procedure may provide an indication of a channel performance metric for a channel between UE 220 and at least one of the base stations 205. In some aspects, the channel measurement procedure may support timing synchronization/tracking, mobility tracking, and the like. Examples of the channel performance metric may include, but are not limited to, RSSI, RSRP, a reference signal received quality (RSRQ), a signal-to-noise ratio (SNR), a throughput, an error rate, and the like, for the channel. In some aspects, the channel measurement procedure may be based on a plurality of SSBs that are broadcast within a transmission occasion, e.g., to support the timing synchronization. Additionally or alternatively, the channel measurement procedure may be based on one or more SSBs received over a plurality of transmission occasions, e.g., to support channel performance metric determination.

In some aspects, UE 220 may transmit a feedback message to one or more of the cells (e.g. one or more of the base stations 205) that carries or otherwise convey an indication of the channel performance metric.

Figure 3:
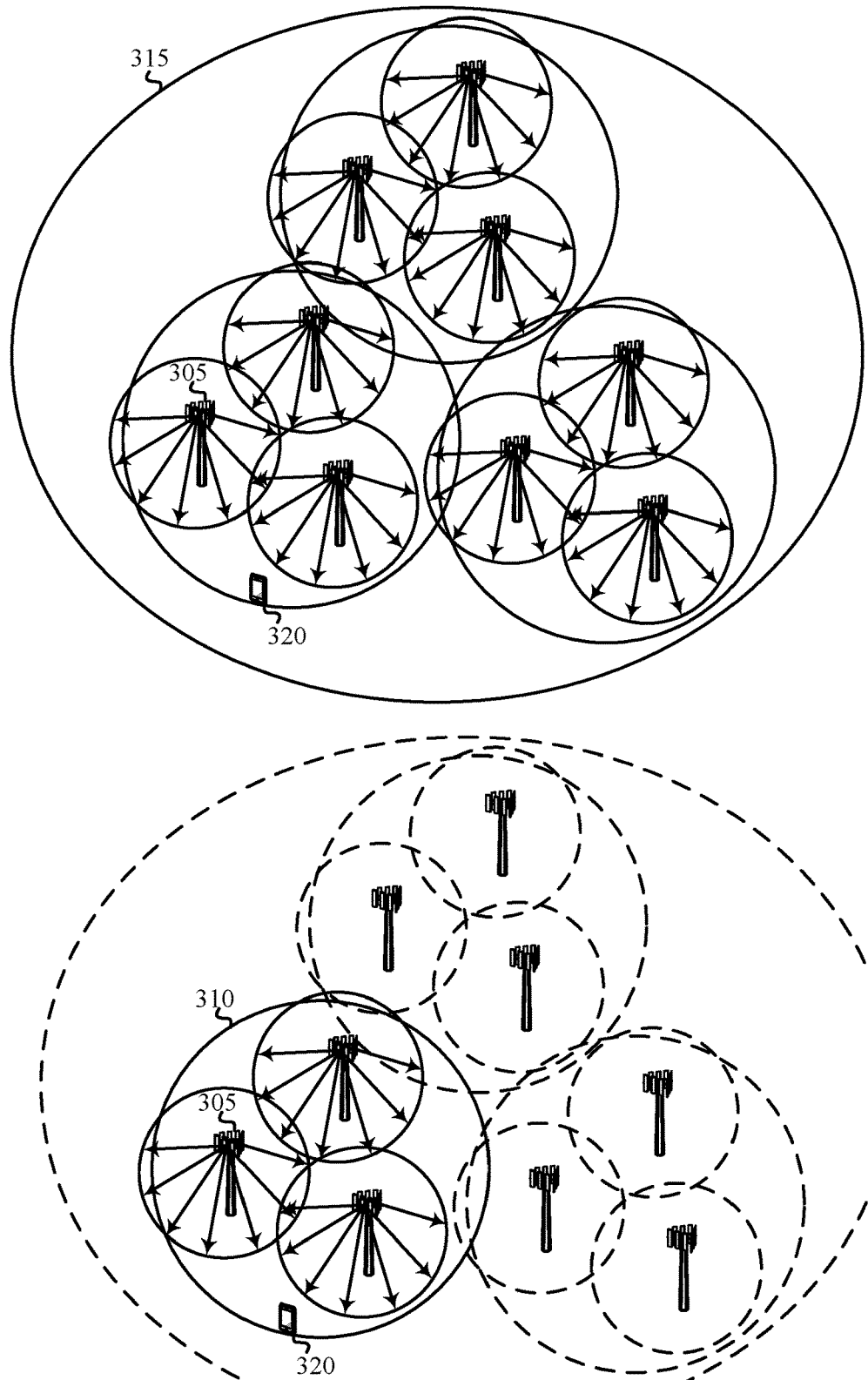
FIG. 3 illustrates an example of a wireless communication system that supports multi-cell notification zone SFN in accordance with aspects of the present disclosure.

FIG. 3 illustrates an example of a wireless communication system 300 that supports multi-cell notification zone SFN in accordance with aspects of the present disclosure. In some examples, wireless communication system 300 may implement aspects of wireless communication systems 100/200. Wireless communication system 300 may include a plurality of base stations 305 and a UE 320, which may be examples of the corresponding devices described herein. Aspects of wireless communication system 300 may be a SFN configured for notification zone 310. In some aspects, the functionalities described with respect to the base stations 305 may refer to functionalities performed by a network entity, such as one or more functions of a core network.

In some aspects, UE 320 may be operating in an RRC inactive or idle state of a DRX mode. Based at least in part on UE 320 operating in the RRC inactive or idle state of the DRX mode, a tracking area 315 may be configured for the UE 320. For example, the tracking area 315 may include a plurality of base stations 305 (with nine base stations 305 being shown by way of example only) configured to transmit signals, e.g., paging signals, to UE 320 in a beam sweeping manner, e.g., using a plurality of beamformed transmissions. When a paging event (or occasion) occurs for UE 320, the network entity may signal each base station 305 within the tracking area 315 to transmit a paging indicator/message in the beam sweeping manner to ensure coverage within each base station's 305 respective coverage area. While the tracking area 315 may provide a wide coverage area in which UE 320 can be paged, the tracking area 315 being used to page UE 320 also consumes a considerable amount of resources and/or reduces efficiency.

Additionally or alternatively, the UE 320 may be operating in an RRC active or inactive state of the DRX mode. Based at least in part on UE 320 operating in the RRC active or inactive state of the DRX mode, a network entity may configure a SFN for UE 320. In some aspects, an SFN may refer to a broadcast network where several transmitters (e.g., a plurality of cells, such as base stations 305) simultaneously send the same signal over the same frequency channel to UE 320. For example, a plurality of the base stations 305 (with three base stations 305 being shown by way of example only) may form the SFN for a notification zone 310 that is configured for UE 320. In some aspects, the size of the notification zone 310 and/or number of base stations 305 included in the notification zone 310 may vary. Accordingly, the notification zone 310 can have more or fewer base stations 305.

In some aspects, this may include the base stations 305 forming the notification zone 310 broadcasting one or more SSBs over the SFN of the notification zone 310. In some aspects, the one or more SSBs broadcast over the SFN may include a SSS, a PSS, and/or a PBCH signal transmitted by the base stations 305 over the SFN for the notification zone 310. In some aspects, the periodicity, timing, and/or frequency for the one or more SSBs broadcast over the SFN by the base stations 305 may be the same or different with respect to cell specific SSBs transmitted by individual base stations 305 of the notification zone 310.

Accordingly, the base stations 305 of the notification zone 310 may transmit cell-specific SSBs as well as the one or more SSBs broadcast over the SFN for the notification zone 310. The one or more SSBs broadcast over the SFN for the notification zone 310 may use some, all, or none of the resources used for the cell-specific SSBs.

In some aspects, the UE 320 may monitor the SFN for the notification zone 310 while operating in the RRC inactive or active state of the DRX mode. Accordingly, UE 320 may receive one or more SSBs broadcast by the plurality of cells (e.g., base stations 305 located within the notification zone 310) over the SFN and perform a channel measurement procedure based at least in part on the received SSBs. Generally, the channel measurement procedure may provide an indication of a channel performance metric for a channel between UE 320 and at least one of the base stations 305. In some aspects, the channel measurement procedure may support timing synchronization/tracking, mobility tracking, frequency tracking, and the like. In some aspects, UE 320 may transmit a feedback message to one or more of the cells (e.g. one or more of the base stations 235) that carries or otherwise convey an indication of the channel performance metric.

Figure 4:
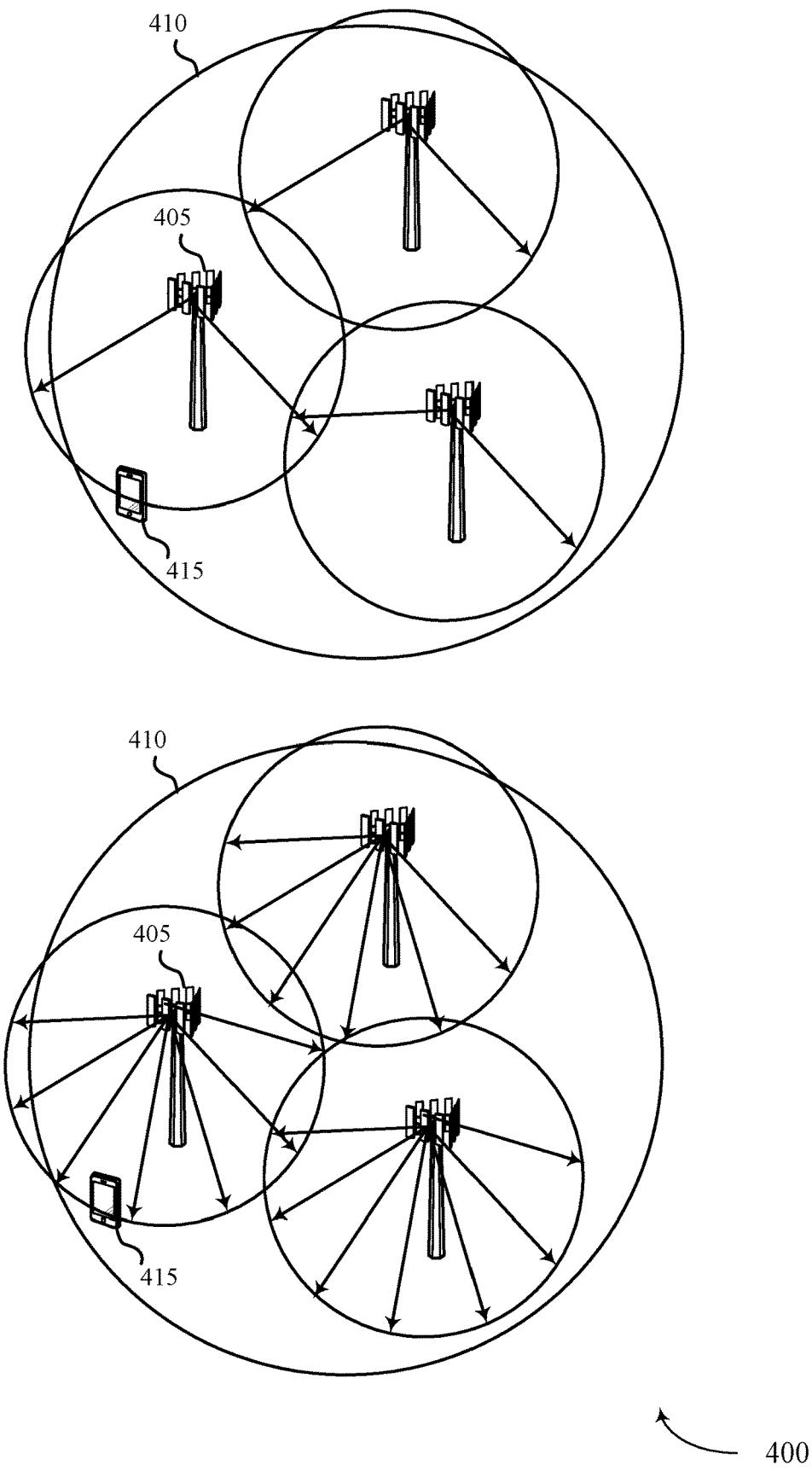
FIG. 4 illustrates an example of a wireless communication system that supports multi-cell notification zone SFN in accordance with aspects of the present disclosure.

FIG. 4 illustrates an example of a wireless communication system 400 that supports multi-cell notification zone SFN in accordance with aspects of the present disclosure. In some examples, wireless communication system 400 may implement aspects of wireless communication systems 100/200/300. Wireless communication system 400 may include a plurality of base stations 405 and a UE 415, which may be examples of the corresponding devices described herein. In some aspects, wireless communication system 400 may, in some aspects, be a SFN configured for notification zone 410 that supports hierarchical mobility and paging functions for UE 415. In some aspects, the functionalities described with respect to the base stations 405 may refer to functionalities performed by a network entity, such as one or more functions of a core network.

In some aspects, UE 415 may be operating in an RRC active or inactive state of a DRX mode. Based at least in part on UE 415 operating in the RRC active or inactive state of the DRX mode, a network entity may configure a SFN for UE 415. In some aspects, an SFN may refer to a broadcast network where several transmitters (e.g., a plurality of cells, such as base stations 405) simultaneously send the same signal over the same frequency channel to UE 415. For example, each of the base stations 405, e.g., cells, may form the SFN for the notification zone 410 that is configured for UE 415.

In some aspects, this may include the base stations 405 forming the notification zone 410 broadcasting one or more SSBs over the SFN of the notification zone 410 (shown in the top of FIG. 4). In some aspects, the one or more SSBs broadcast over the SFN may include a SSS, a PSS, and/or a PBCH signal transmitted by the base stations 405 over the SFN for the notification zone 410. In some aspects, the one or more SSBs broadcast over the SFN for the notification zone 410 may be transmitted using an omni-directional transmission.

In some aspects, this may include the base stations 405 forming the notification zone 410 broadcasting, respectively, cell-specific SSBs within their respective coverage areas (shown in the bottom of FIG. 4). In some aspects, the one or more cell-specific SSBs broadcast by the base stations 405 forming the notification zone 410 may be transmitted in a beam sweeping manner using a plurality of transmit beams.

In some aspects, the periodicity, timing, and/or frequency for the one or more SSBs broadcast over the SFN by the base stations 405 may be the same or different with respect to the cell specific SSBs transmitted by individual base stations 405 within the notification zone 410. Accordingly, the base stations 405 of the notification zone 410 may transmit cell-specific SSBs as well as the one or more SSBs broadcast over the SFN for the notification zone 410. The one or more SSBs broadcast over the SFN for the notification zone 410 may use some, all, or none, of the resources used for the cell-specific SSBs.

In some aspects, the UE 415 may monitor the SFN for the notification zone 410 while operating in the RRC inactive or active state of the DRX mode. Accordingly, UE 415 may receive one or more SSBs broadcast by the plurality of cells (e.g., base stations 405 located within the notification zone 410) over the SFN and/or cell-specific SSBs transmitted by respective base stations 405 within the notification zone 410 and perform a channel measurement procedure based at least in part on the received SSBs. Generally, the channel measurement procedure may provide an indication of a channel performance metric for a channel between UE 415 and at least one of the base stations 405. In some aspects, the channel measurement procedure may support timing synchronization/tracking, mobility tracking, frequency tracking, and the like. In some aspects, UE 415 may transmit a feedback message to one or more of the cells (e.g. one or more of the base stations 405) that carries or otherwise convey an indication of the channel performance metric.

Figure 5:
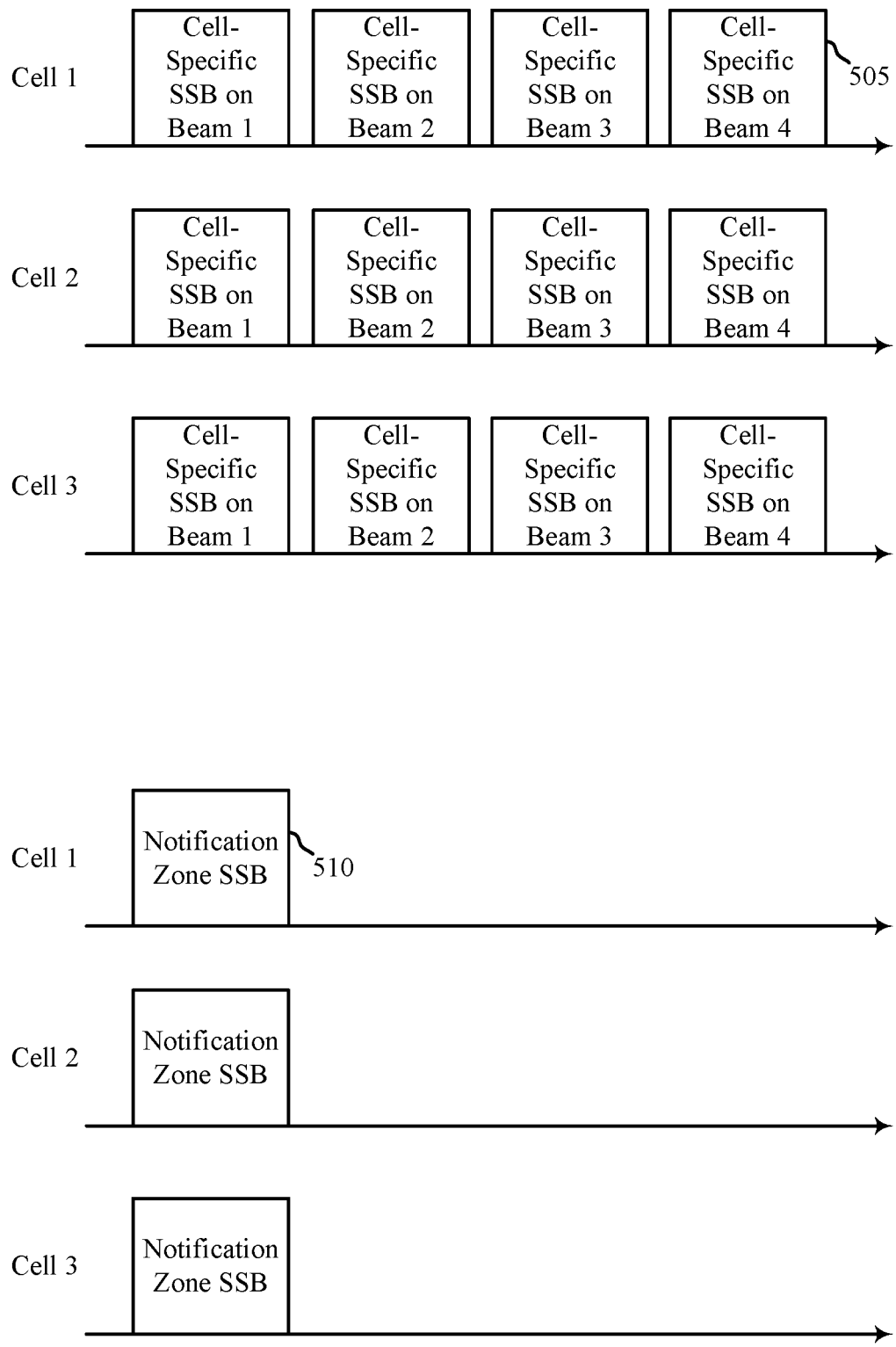
FIG. 5 illustrates an example of a synchronization signal block (SSB) configuration that supports multi-cell notification zone SFN in accordance with aspects of the present disclosure.

FIG. 5 illustrates an example of a SSB configuration 500 that supports multi-cell notification zone SFN in accordance with aspects of the present disclosure. In some examples, SSB configuration 500 may implement aspects of wireless communication systems 100/200/300/400. Aspects of SSB configuration 500 may be implemented by a network entity, base station, and/or UE, which may be examples of the corresponding devices described herein.

Generally, a network entity may configure a SFN for a notification zone for a UE when the UE is operating in a RRC active or inactive state of a DRX mode. In some aspects, the notification zone (e.g., RNA) may include a plurality of cells, e.g., base stations. In the example SSB configuration 500, the notification zone includes three cells (e.g., cell 1, cell 2, and cell 3), although notification zones having more or fewer cells may also be used. Generally, the SFN for the notification zone may be used to broadcast one or more SSBs 510 over the SFN from the cells within the notification zone. For example, each of the cells within the notification zone may broadcast over the SFN one or more SSBs 510 on the same frequency channel, at the same time, and the like. In some aspects, the one or more SSBs 510 broadcast over the SFN for the notification zone may be broadcast in a omni-directional transmission and/or in a directional transmission using one or more beams. In the example SSB configuration 500, the one or more SSBs 510 are broadcast in an omni-directional transmission and at the same time.

In some aspects, the plurality of cells forming the SFN for the notification zone may also transmit cell specific SSBs 505 in a beam sweeping manner. For example, cell 1 may transmit a cell specific SSB 505 on beam one during a first time period, followed by transmitting the cell specific SSB 505 on beam two during a second time period, and so forth. Cells 2 and 3 may also transmit cell specific SSBs 505 in a beam sweeping manner, where each cell specific SSB is transmitted on a particular beam during a particular time period.

In some aspects, the cell specific SSBs 505 may be transmitted at the same time or at a different time as the one or more SSBs 510 broadcast over the SFN. In the example SSB configuration 500, the one or more SSBs 510 broadcast over the SFN are transmitted at the same time as the cell specific SSB 505 transmitted on beam one by cells 1-3. In some aspects, the cell specific SSBs 505 may be transmitted using the same periodicity and/or a different periodicity as the one or more SSBs 510 broadcast over the SFN. In some aspects, the cell specific SSBs 505 may be transmitted using the same numerology or a different numerology as the one or more SSBs 510 broadcast over the SFN. In some aspects, the cell specific SSBs 505 may be transmitted using a different identifier or the same identifier as is associated with the one or more SSBs 510 broadcast over the SFN.

In some aspects, a UE may receive the one or more SSBs 510 broadcast over the SFN and use the one or more SSBs 510 to perform a channel measurement procedure, e.g., to determine a channel performance metric and/or for timing/frequency synchronization and alignment. In some aspects, the UE may transmit a feedback report to one or more cells within the notification zone carrying or otherwise conveying an indication of a result of the channel measurement procedure. In some aspects, the UE may simply use the results of the channel measurement procedure for channel performance determination, timing synchronization, and the like.

Thus, SSB configuration 500 provides a mechanism where the UE behavior is simplified by monitoring the one or more SSBs 510 broadcast over the SFN for the notification zone for channel performance determination and/or paging. In some aspects, a paging overhead may be reduced in time using SSB configuration 500 due to the simultaneous notification zone paging.

Figure 6:
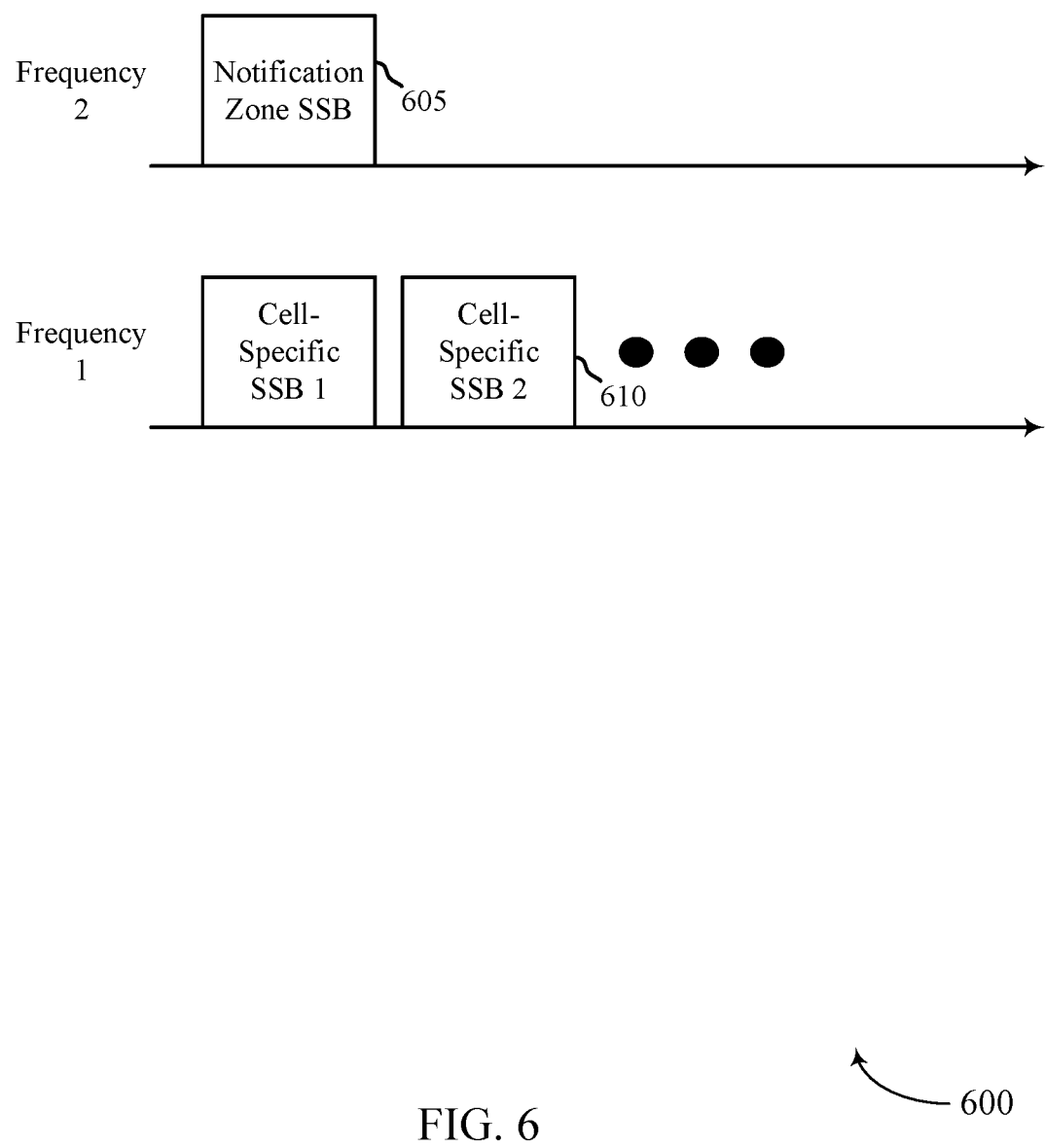
FIG. 6 illustrates an example of a SSB configuration that supports multi-cell notification zone SFN in accordance with aspects of the present disclosure.

FIG. 6 illustrates an example of a SSB configuration 600 that supports multi-cell notification zone SFN in accordance with aspects of the present disclosure. In some examples, SSB configuration 600 may implement aspects of wireless communication systems 100/200/300/400 and/or SSB configuration 500. Aspects of SSB configuration 600 may be implemented by a network entity, base station, and/or UE, which may be examples of the corresponding devices described herein.

Generally, a network entity may configure a SFN for a notification zone for a UE when the UE is operating in a RRC inactive state (or RRC active state) of a DRX mode. In some aspects, the notification zone (e.g., RNA) may include a plurality of cells, e.g., base stations. Generally, the SFN for the notification zone may be used to broadcast one or more SSBs 605 over the SFN from the cells within the notification zone. For example, each of the cells within the notification zone may broadcast over the SFN one or more SSBs 605 on the same frequency channel, at the same time, and the like. In the example SSB configuration 600, the one or more SSBs 605 are broadcast over the SFN on frequency two by each cell within the notification zone. In some aspects, the one or more SSBs 605 broadcast over the SFN for the notification zone may be broadcast in a omni-directional transmission and/or in a directional transmission using one or more beams. In the example SSB configuration 600, the one or more SSBs 605 are broadcast in an omni-directional transmission and at the same time.

In some aspects, the plurality of cells forming the SFN for the notification zone may also transmit cell specific SSBs 610 in a beam sweeping manner. For example, cell one may transmit a cell specific SSB 610 during a first time period, followed by transmitting the cell specific SSB 610 during a second time period, and so forth. In some aspects, the cell specific SSB 610 transmitted in the first time period and the cell specific SSB 610 transmitted in the second time period may be directional transmissions, e.g., transmitted using different transmit beams. In other aspects, the cell specific SSB 610 transmitted in the first time period and the cell specific SSB 610 transmitted in the second time period may be omni-directional transmissions. In the example SSB configuration 600, the cell specific SSBs 610 are transmitted on frequency one, which is different from frequency two used for broadcasting the one or more SSBs 605 over the SFN.

In some aspects, a UE may receive the one or more SSBs 605 broadcast over the SFN and use the one or more SSBs 605 to perform a channel measurement procedure, e.g., to determine a channel performance metric and/or for timing synchronization/alignment. In some aspects, the UE may transmit a feedback report to one or more cells within the notification zone carrying or otherwise conveying an indication of a result of the channel measurement procedure. In some aspects, the UE may simply use the results of the channel measurement procedure for channel performance determination, timing synchronization, and the like.

In some aspects, SSB configuration 600 provides one example of multiplexing of one or more SSBs 605 broadcast over the SFN for the notification zone and cell specific SSBs 610 transmitted by individual cells within the notification zone. In the example SSB configuration 600, the one or more SSBs broadcast over the SFN for the notification zone and the cell-specific SSBs 610 use different frequencies. In some aspects, this may include the one or more SSBs 605 broadcast over the SFN for the notification zone being transmitted on the non-sync raster when or more SSBs 605 includes both the notification zone PSS/SSS. For example, this may provide some frequency separation between the frequency location of the one or more SSBs 605 and the closest sync raster to avoid confusion for initial access UEs.

Thus, SSB configuration 600 provides a mechanism where the UE behavior is simplified by monitoring the one or more SSBs 605 broadcast over the SFN for the notification zone for channel performance determination and/or paging. In some aspects, a paging overhead may be reduced in time using SSB configuration 600 due to the simultaneous notification zone paging.

Figure 7:
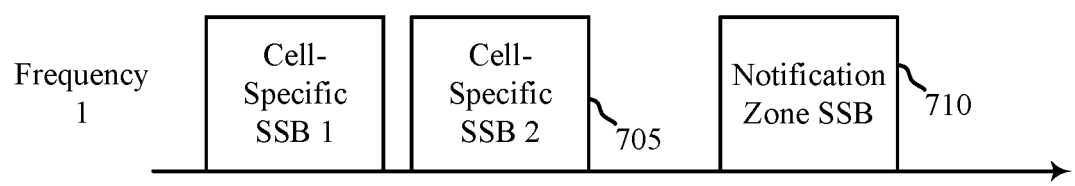
FIG. 7 illustrates an example of a SSB configuration that supports multi-cell notification zone SFN in accordance with aspects of the present disclosure.

FIG. 7 illustrates an example of a SSB configuration 700 that supports multi-cell notification zone SFN in accordance with aspects of the present disclosure. In some examples, SSB configuration 700 may implement aspects of wireless communication systems 100/200/300/400 and/or SSB configurations 500/600. Aspects of SSB configuration 700 may be implemented by a network entity, base station, and/or UE, which may be examples of the corresponding devices described herein.

Generally, a network entity may configure a SFN for a notification zone for a UE when the UE is operating in a RRC inactive state or active state of a DRX mode. In some aspects, the notification zone (e.g., RNA) may include a plurality of cells, e.g., base stations. Generally, the SFN for the notification zone may be used to broadcast one or more SSBs 710 over the SFN from the cells within the notification zone. For example, each of the cells within the notification zone may broadcast over the SFN one or more SSBs 710 on the same frequency channel, at the same time, and the like. In the example SSB configuration 700, the one or more SSBs 710 are broadcast over the SFN on frequency one by each cell within the notification zone. In some aspects, the one or more SSBs 710 broadcast over the SFN for the notification zone may be broadcast in a omni-directional transmission and/or in a directional transmission using one or more beams.

In some aspects, the plurality of cells forming the SFN for the notification zone may also transmit cell specific SSBs 705. For example, a cell may transmit a cell specific SSB 705 during a first time period, followed by transmitting the cell specific SSB 705 again during a second time period, and so forth. In some aspects, the cell specific SSB 705 transmitted in the first time period and the cell specific SSB 705 transmitted in the second time period may be directional transmissions, e.g., transmitting using different transmit beams. In other aspects, the cell specific SSB 705 transmitted in the first time period and the cell specific SSB 705 transmitted in the second time period may be omni-directional transmissions. In the example SSB configuration 700, the cell specific SSBs 705 are transmitted on frequency one, which is the same frequency used for broadcasting the one or more SSBs 710 over the SFN.

In the example SSB configuration 700, the cell specific SSBs 705 are transmitted at a different time as the one or more SSBs 710 broadcast over the SFN. In some aspects, a UE may receive the one or more SSBs 710 broadcast over the SFN and use the one or more SSBs 710 to perform a channel measurement procedure, e.g., to determine a channel performance metric and/or for timing synchronization/alignment/tracking. In some aspects, the UE may transmit a feedback report to one or more cells within the notification zone carrying or otherwise conveying an indication of a result of the channel measurement procedure. In some aspects, the UE may simply use the results of the channel measurement procedure for channel performance determination, timing synchronization/tracking, and the like.

In some aspects, SSB configuration 700 provides one example of multiplexing of one or more SSBs 710 broadcast over the SFN for the notification zone and cell specific SSBs 705 transmitted by individual cells within the notification zone. In the example SSB configuration 700, the one or more SSBs 710 broadcast over the SFN of the notification zone and the cell-specific SSBs 705 are transmitted using the same frequency. In some aspects, the one or more SSBs 710 and the cell specific SSBs 705 may be transmitted using the same center frequency. In some aspects, a subset of identifiers used for the cell specific SSBs 705 may be reserved as identifiers for the one or more SSBs 710 broadcast over the SFN, e.g., to distinguish from cell-specific SSBs 705 when the one or more SSBs 710 include both PSS/SSS for the notification zone. Based on whether the identifier is from the subset of identifiers, an initial access UE may be able to distinguish between the one or more SSBs 710 and the cell specific SSBs 705.

Figure 8:
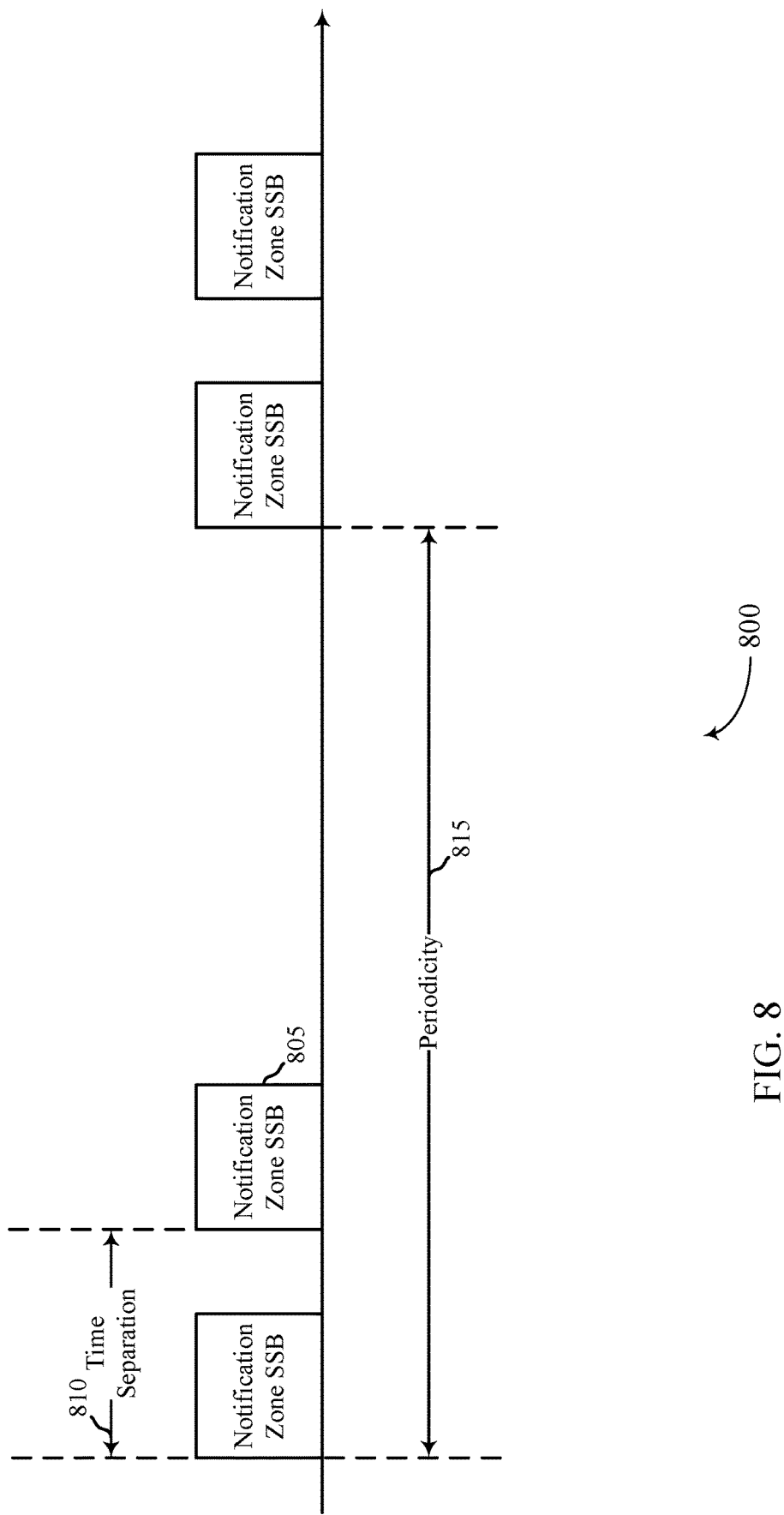
FIG. 8 illustrates an example of a SSB configuration that supports multi-cell notification zone SFN in accordance with aspects of the present disclosure.

FIG. 8 illustrates an example of a SSB configuration 800 that supports multi-cell notification zone SFN in accordance with aspects of the present disclosure. In some examples, SSB configuration 800 may implement aspects of wireless communication systems 100/200/300/400 and/or SSB configurations 500/600/700. Aspects of SSB configuration 800 may be implemented by a network entity, base station, and/or UE, which may be examples of the corresponding devices described herein.

Generally, a network entity may configure a SFN for a notification zone for a UE when the UE is operating in a RRC inactive state or active state of a DRX mode. In some aspects, the notification zone (e.g., RNA) may include a plurality of cells. Generally, the SFN for the notification zone may be used to broadcast one or more SSBs 805 over the SFN from the cells within the notification zone. For example, each of the cells within the notification zone may broadcast over the SFN one or more SSBs 805 on the same frequency channel, at the same time, and the like. In the example SSB configuration 800, the one or more SSBs 805 are broadcast over the SFN on frequency one by each cell within the notification zone. In some aspects, the one or more SSBs 805 broadcast over the SFN for the notification zone may be broadcast in a omni-directional transmission and/or in a directional transmission using one or more beams.

Generally, the one or more SSBs 805 may be broadcast over the SFN separated by the time separation 810 and/or according to a periodicity 815. In some aspects, the periodicity 815 may also be referred to as a transmission occasion.

The time separation 810 may generally refer to the separation in time between transmissions of the one or more SSBs 805 broadcast over the SFN for the notification zone within a transmission occasion. Accordingly, one or more SSBs 805 may be broadcast over the SFN according to a pattern (e.g., varying degrees of time separation 810 between each instance), where the pattern is repeated for each transmission occasion (e.g., periodicity 815).

As is discussed above, the cells within the notification zone may also transmit cell specific SSBs (not shown) in addition to the one or more SSBs 805 broadcast over the SFN of the notification zone.

In some aspects, a UE may receive the one or more SSBs 805 broadcast over the SFN and use the one or more SSBs 805 to perform a channel measurement procedure, e.g., to determine a channel performance metric and/or for timing and/or frequency synchronization/alignment/tracking. In some aspects, the UE may use the one or more SSBs 805 transmitted within a transmission occasion to perform timing synchronization and tracking, e.g., the time separation 810 may be dependent upon the required accuracy for Doppler estimation. In some aspects, the UE may use the one or more SSBs 805 transmitted within a transmission occasion and/or over multiple transmission occasions to perform channel performance determinations. For example, the channel performance measurement procedure may be based on one or more SSBs 805 transmitted within a transmission occasion, e.g., for tracking, and/or one or more SSBs 805 transmitted across multiple transmission occasions, e.g. for channel performance determination. In some aspects, the UE may transmit a feedback report to one or more cells within the notification zone carrying or otherwise conveying an indication of a result of the channel measurement procedure. In some aspects, the UE may simply use the results of the channel measurement procedure for channel performance determination, timing synchronization/tracking, and the like.

In some aspects, the UE may monitor the one or more SSB 805 for channel performance determination. In some aspects, this may include support for notification zone based paging. In some aspects, this may include the UE performing time/frequency/Doppler tracking functionalities. In some aspects, the one or more SSB 805 broadcast over the SFN may provide such tracking functionalities. Thus, the same SSB 805 broadcast over the SFN may be repeated over a transmission occasion. Two SSBs 805 may be transmitted in one transmission occasion with some time separation 810 between two transmissions, where each SSB 805 transmitted in the transmission occasion are the same or are different. Time separation 810 may be fixed (e.g., in the specification), or signaled to the UE as part of SFN for the notification zone configuration, in a system information or RRC message, and the like.

Figure 9:
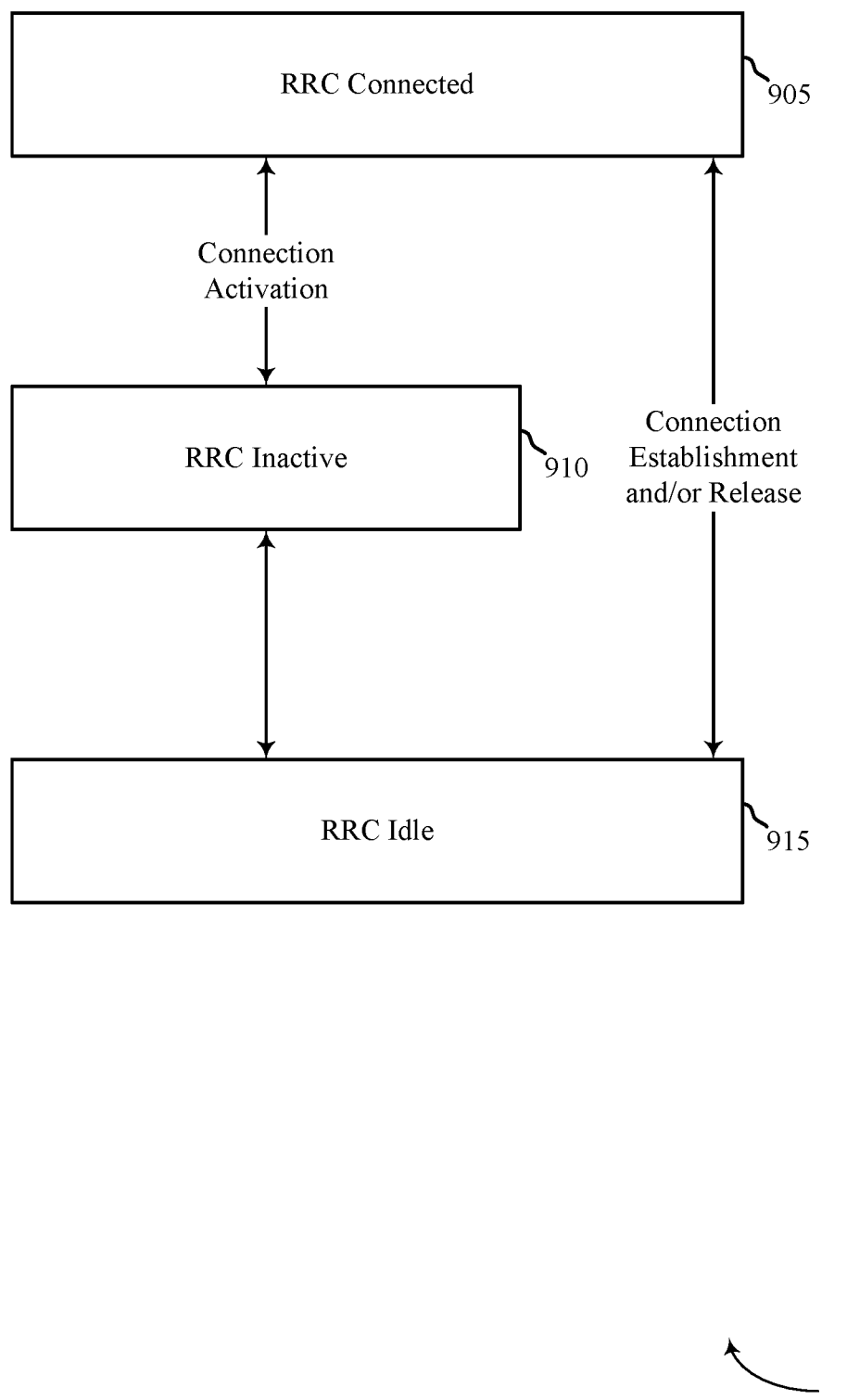
FIG. 9 illustrates an example of a discontinuous reception (DRX) configuration that supports multi-cell notification zone SFN in accordance with aspects of the present disclosure.

FIG. 9 illustrates an example of a DRX configuration 900 that supports multi-cell notification zone SFN in accordance with aspects of the present disclosure. In some examples, DRX configuration 900 may implement aspects of wireless communication systems 100/200/300/400 and/or SSB configurations 500/600/700/800. Aspects of DRX configuration 900 may be implemented by a UE, which may be an example of the corresponding device described herein. Generally, DRX configuration 900 illustrates example states that a UE may be operating in while operating in a DRX mode.

Generally, a UE may be configured with a state machine and perform one or more state transitions. In some aspects, the UE may only operate in one RRC state at any given instance. For example, the UE may be operating in a RRC connected state 905 (which may also be referred to as an RRC active state), an RRC inactive state 910, or in an RRC idle state 915. In some aspects, the RRC connected state 905 may include the UE having an active connection to at least one cell or base station to perform active data communications. In some aspects, the RRC inactive state 910 may include the UE operating in an idle mode, but maintaining context information for the AS. For example, a UE-specific DRX mode may be configured for the UE by upper layers, RRC layer, etc., where the UE may perform notification zone-based updates when moving outside the notification zone area. In some aspects, the RRC idle state 915 may include the UE powering down certain components, functions, processes, and the like, to conserve power. In some aspects, the RRC idle state 915 may include the UE performing an initial access procedure to search for a serving cell to camp on.

As is discussed above, a SFN for a notification zone may be configured for the UE when the UE is operating in the RRC connected state 905 and/or in the RRC inactive state 910. The base stations forming the notification zone of the SFN may broadcast one or more SSBs to the UE, as well as cell-specific SSBs, which the UE may use to perform a channel measurement procedure. Based on the results of the channel measurement procedure (e.g., based on the received SSBs), the UE may perform timing and/or frequency based tracking and updates.

Figure 10:
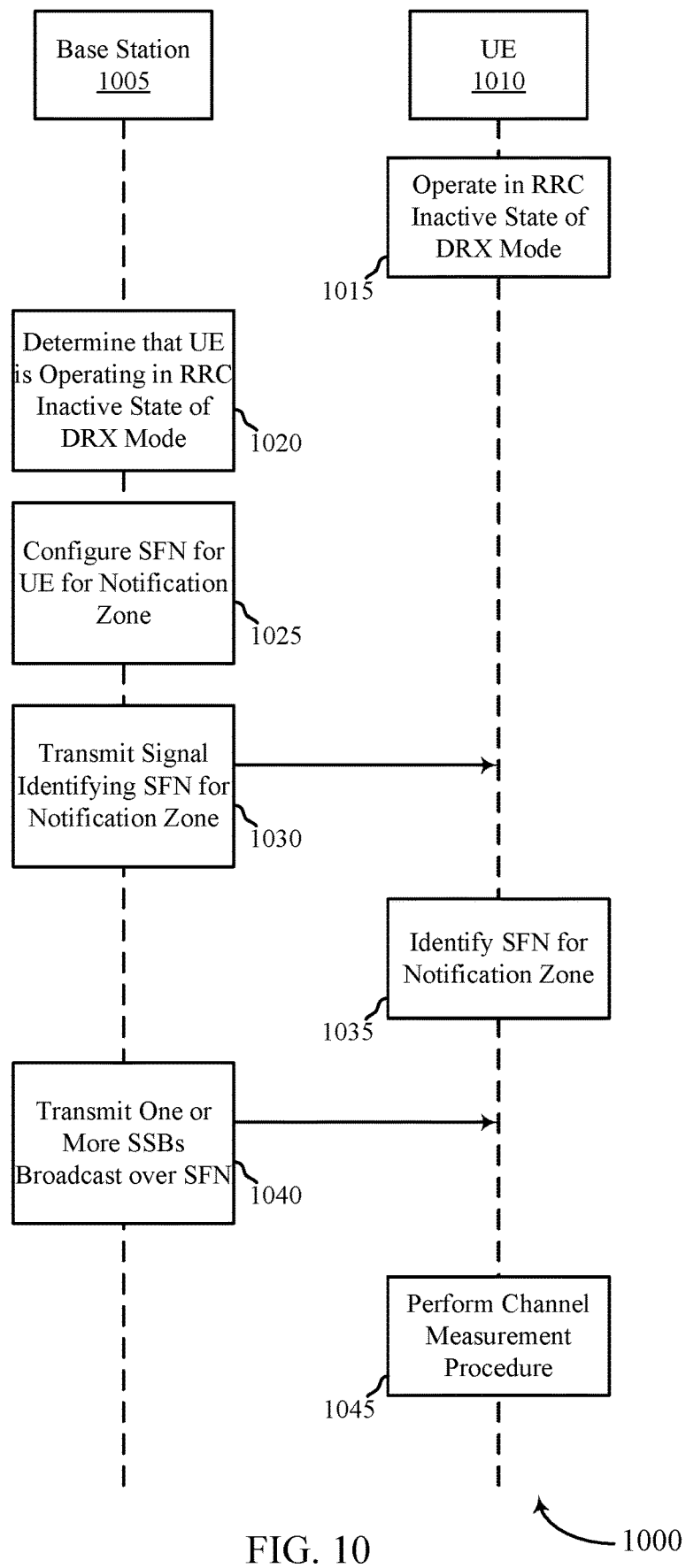
FIG. 10 illustrates an example of a process that supports multi-cell notification zone SFN in accordance with aspects of the present disclosure.

FIG. 10 illustrates an example of a process 1000 that supports multi-cell notification zone SFN in accordance with aspects of the present disclosure. In some examples, process 1000 may implement aspects of wireless communication systems 100/200/300/400, SSB configurations 500/600/700/800 and/or DRX configuration 900. Aspects of process 1000 may be implemented by a base station 1005 and/or a UE 1010, which may be examples of the corresponding devices described herein. In some aspects, the functions described with respect to base station 1005 may be performed by a network entity, e.g., such as one or more components of a core network.

At 1015, UE 1010 may operate in an RRC inactive state of the DRX mode. In some aspects, this may include UE 1010 communicating with base station 1005 (e.g., a network entity) in order to configure the DRX mode for UE 1010.

At 1020, base station 1005 may determine that the UE 1010 is operating in an RRC inactive state of a DRX mode. In some aspects, this may include UE 1010 communicating with base station 1005 (e.g., a network entity) in order to configure the DRX mode for UE 1010.

At 1025, base station 1005 may configure a SFN for UE 1010 for a notification zone. For example, base station 1005 may identify one or more cells operating within a defined range of UE 1010 and select the cells to form the notification zone. In some aspects, this may include base station 1005 configuring the plurality of cells to transmit one or more SSBs to UE 1010 at the same time and/or on the same frequency. In some aspects, this may be based on support for SFN operations within the notification zone by a base station 1005 and/or UE 1010. For example, UE 1010 may transmit (and base station 1005 may receive) a signal indicating that UE 1010 supports the SFN for the notification zone. In response, base station 1005 may transmit (and UE 1010 may receive) a second signal indicating that the SFN for the notification cell has been configured for the UE. In some aspects, this may include base station 1005 transmitting (and UE 1010 receiving) a signal indicating that a network entity supports the SFN for the notification zone. In this context, the network entity may refer to base station 1005 as well as one or more other base stations.

At 1030, base station 1005 may transmit (and UE 1010 may receive) a signal identifying the SFN for the notification zone (e.g., configuration of SSBs broadcast by the cells in the notification zone). In some aspects, the signal may include a system information signal and/or in a RRC message. In some aspects, the signal may identify the SFN for the notification zone. In some aspects, the signal may carry or otherwise convey an indication of a frequency parameter for the SFN, a time parameter for transmission of the one or more SSBs broadcast over the SFN, a periodicity parameter for transmission of the one or more SSBs broadcast over the SFN, and/or a numerology parameter for the one or more SSBs broadcast over the SFN.

At 1035, UE 1010 may identify the SFN for the notification zone. In some aspects, this may include UE 1010 receiving the signal transmitted by base station 1005 which carries or otherwise conveys an indication of an identifier for the SFN.

At 1040, base station 1005 may transmit (and UE 1010 may receive) one or more SSBs broadcast over the SFN for the notification zone. In some aspects, this may include a base station 1005 transmitting (and UE 1010 receiving) a plurality of SSBs within a transmission occasion. In some aspects, this may include base station 1005 transmitting (and UE 1010 receiving) one or more SSBs over a plurality of transmission occasions. In some aspects, this also may include base station 1005 (as well as other cells within the notification zone) transmitting (and UE 1010 receiving) one or more cell specific SSBs. In some aspects, the one or more cell specific SSBs may be on a same frequency or on a different frequency, at a same time or at a different time, use a different periodicity or the same periodicity, as the one or more SSBs broadcast over the SFN. In some aspects, the one or more SSBs broadcast over the SSN may include a SSS, a PSS/SSS, or a PSS/SSS/P BCH.

At 1045, UE 1010 may perform a channel measurement procedure based on the received one or more SSBs broadcast over the SFN. In some aspects, this may include UE 1010 updating one or more of a timing tracking function or a frequency tracking function, based at least in part on the one or more SSBs broadcast by the cells within the notification zone. In some aspects, UE 1010 may use a plurality of SSBs transmitted within a transmission occasion in the channel measurement procedure to update the timing tracking function. In some aspects, this may include UE 1010 identifying a channel performance metric based on the channel measurement procedure. For example, the channel measurement procedure may be used to identify a RSSI, RSSQ, RSRP, SNR, SINR, a throughput, an error rate, and the like.

Figure 11:
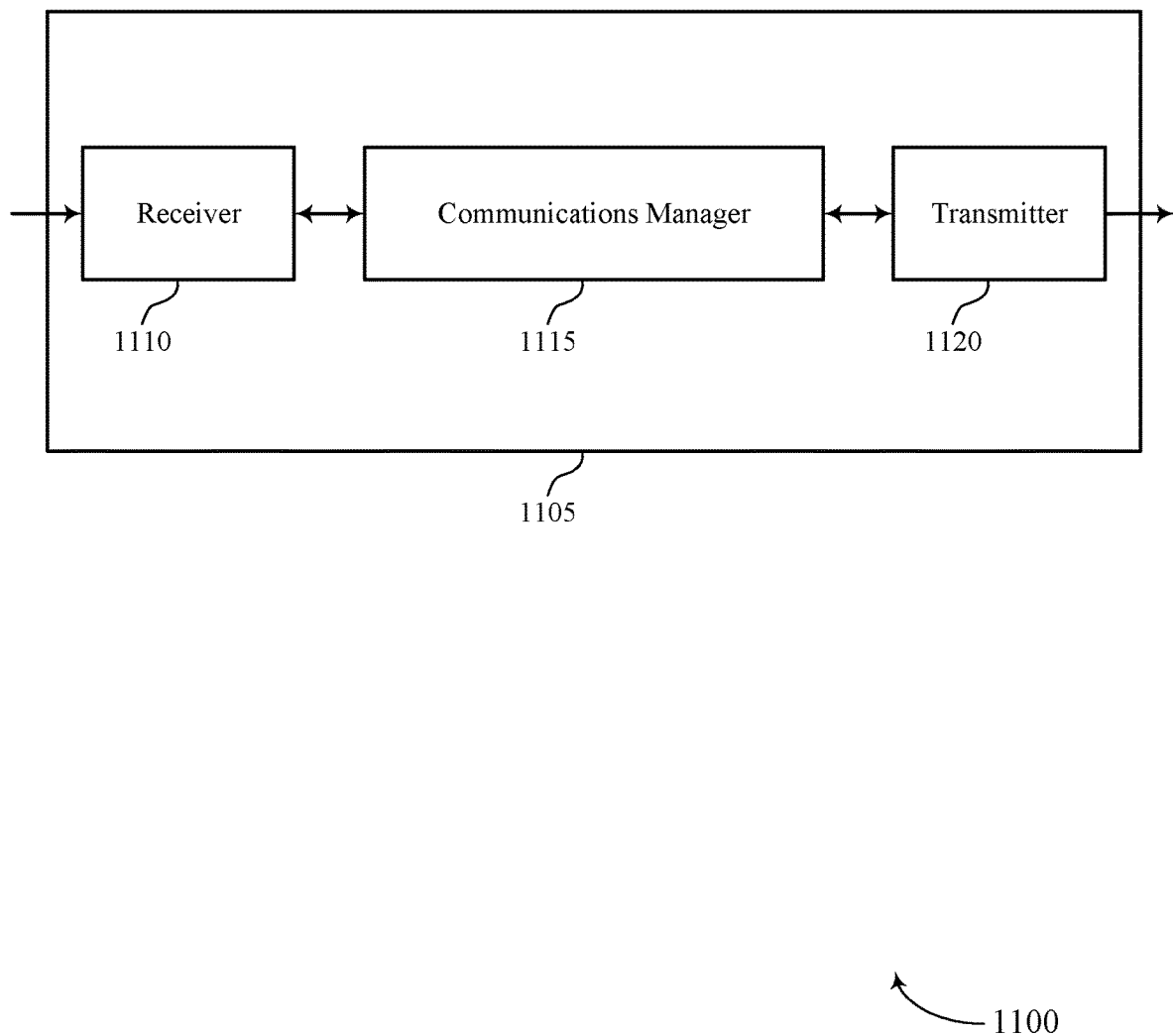
FIGS. 11 and 12 show block diagrams of devices that support multi-cell notification zone SFN in accordance with aspects of the present disclosure.

FIG. 11 shows a block diagram 1100 of a device 1105 that supports multi-cell notification zone SFN in accordance with aspects of the present disclosure. The device 1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to multi-cell notification zone SFN, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may operate in a RRC inactive state of a DRX mode, identify, based on the UE operating in the RRC inactive state, a SFN for a notification zone that is configured for the UE, the notification zone including a set of cells, receive one or more SSBs broadcast by the set of cells over the SFN, and perform a channel measurement procedure based on the one or more SSBs received over the SFN. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
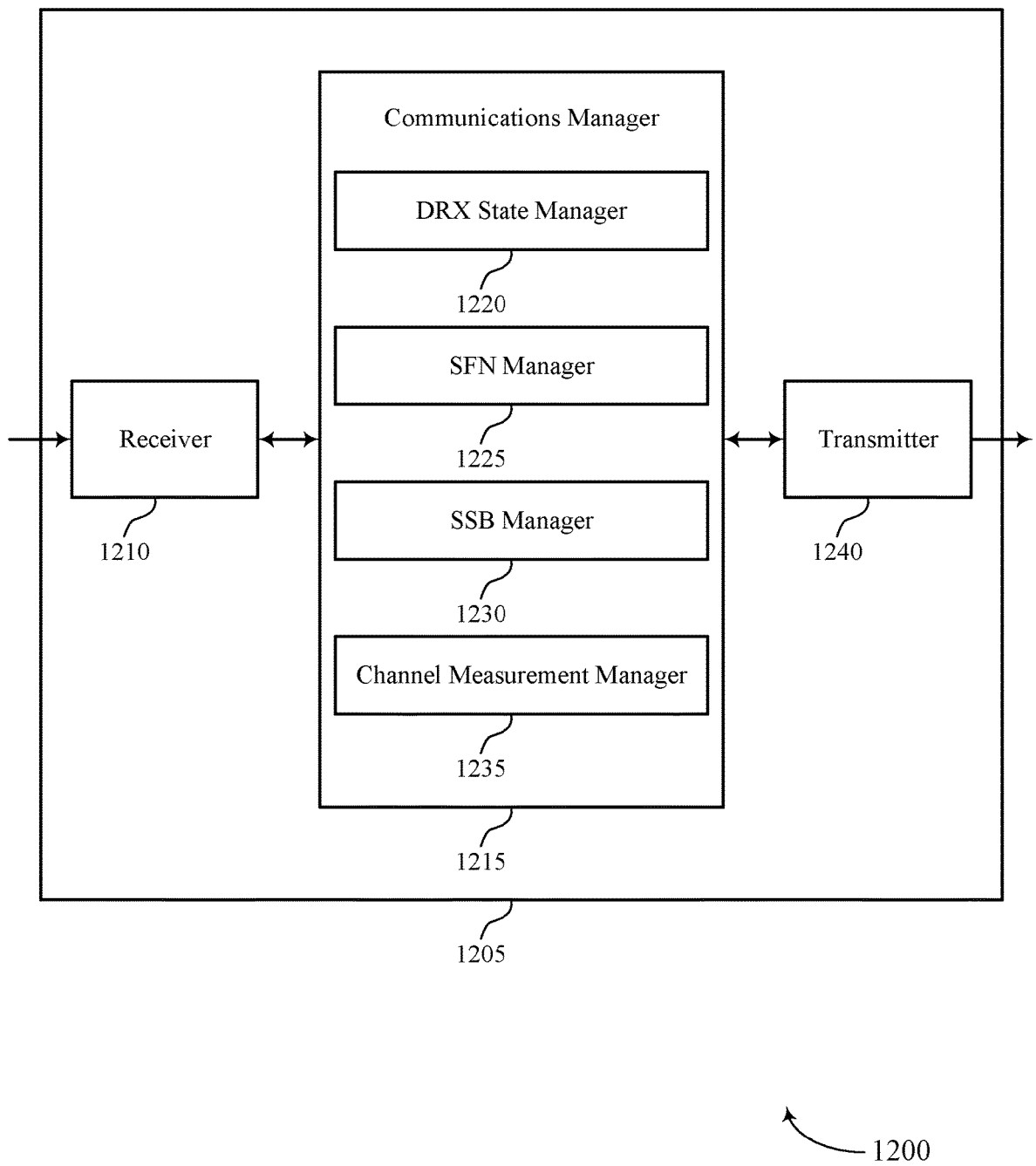

FIG. 12 shows a block diagram 1200 of a device 1205 that supports multi-cell notification zone SFN in accordance with aspects of the present disclosure. The device 1205 may be an example of aspects of a device 1105 or a UE 115 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to multi-cell notification zone SFN, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a DRX state manager 1220, a SFN manager 1225, a SSB manager 1230, and a channel measurement manager 1235. The communications manager 1215 may be an example of aspects of the communications manager 1410 described herein.

The DRX state manager 1220 may operate in a RRC inactive state of a DRX mode.

The SFN manager 1225 may identify, based on the UE operating in the RRC inactive state, a SFN for a notification zone that is configured for the UE, the notification zone including a set of cells.

The SSB manager 1230 may receive one or more SSBs broadcast by the set of cells over the SFN.

The channel measurement manager 1235 may perform a channel measurement procedure based on the one or more SSBs received over the SFN.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
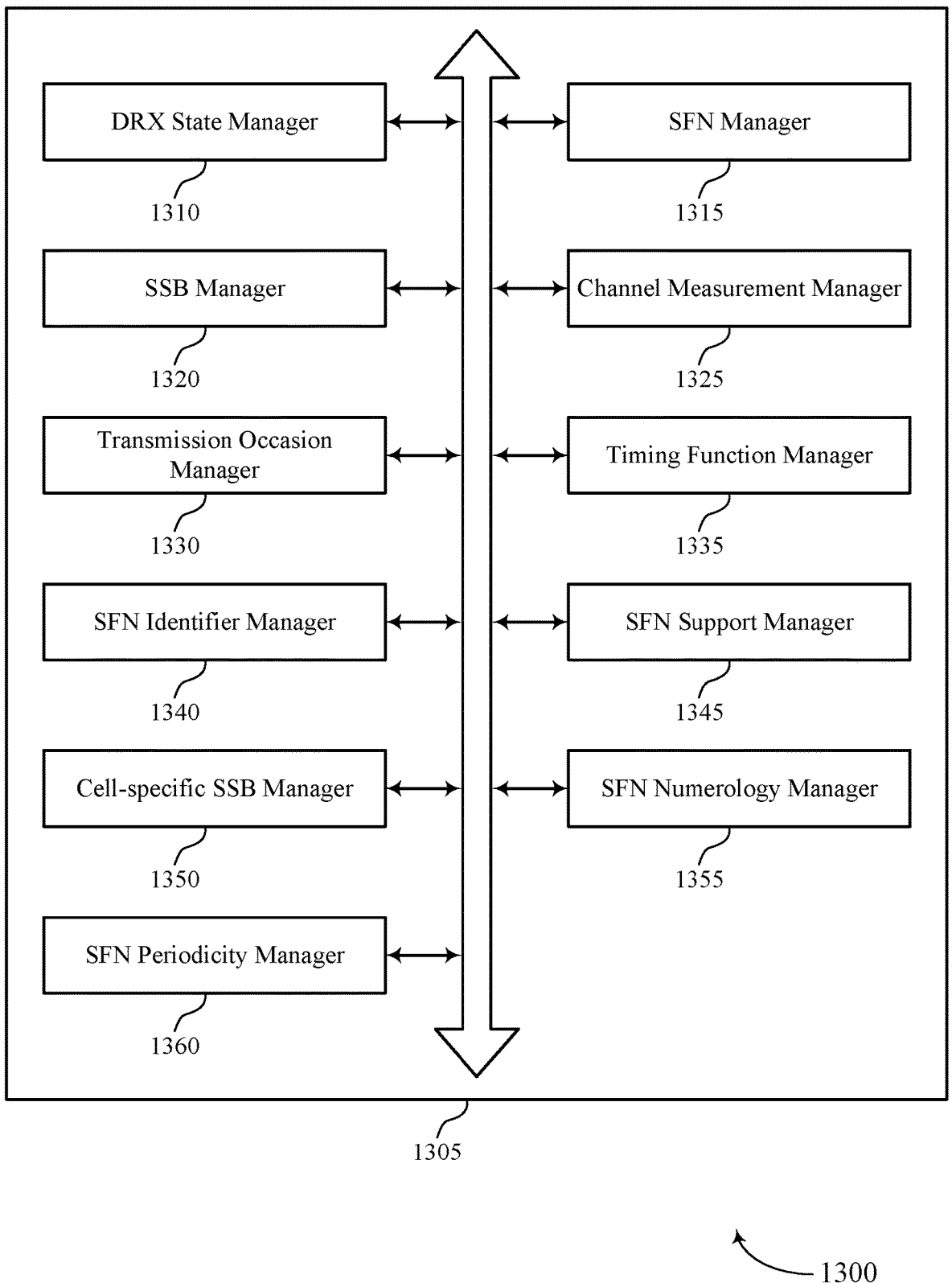
FIG. 13 shows a block diagram of a communications manager that supports multi-cell notification zone SFN in accordance with aspects of the present disclosure.

FIG. 13 shows a block diagram 1300 of a communications manager 1305 that supports multi-cell notification zone SFN in accordance with aspects of the present disclosure. The communications manager 1305 may be an example of aspects of a communications manager 1115, a communications manager 1215, or a communications manager 1410 described herein. The communications manager 1305 may include a DRX state manager 1310, a SFN manager 1315, a SSB manager 1320, a channel measurement manager 1325, a transmission occasion manager 1330, a timing function manager 1335, a SFN identifier manager 1340, a SFN support manager 1345, a cell-specific SSB manager 1350, a SFN numerology manager 1355, and a SFN periodicity manager 1360. Each of these modules may communicate, directly or indirectly, with one another (e.g., via one or more buses).

The DRX state manager 1310 may operate in a RRC inactive state of a DRX mode.

The SFN manager 1315 may identify, based on the UE operating in the RRC inactive state, a SFN for a notification zone that is configured for the UE, the notification zone including a set of cells.

The SSB manager 1320 may receive one or more SSBs broadcast by the set of cells over the SFN. In some examples, the SSB manager 1320 may decode the SSS to determine an identifier for the notification zone. In some examples, the SSB manager 1320 may decode the PSS and the SSS to determine an identifier for the notification zone. In some cases, a PSS associated with the SSS includes a defined identifier that is different from the identifier for the notification zone. In some cases, the one or more SSBs are received on a non-synchronized raster with respect to one or more cell-specific SSBs from the set of cells. In some cases, the one or more SSBs include one or more of a PSS, a SSS, and/or a PBCH signal. In some cases, the one or more SSBs include a PBCH signal indicating notification zone specific configuration information.

The channel measurement manager 1325 may perform a channel measurement procedure based on the one or more SSBs received over the SFN. In some cases, the channel measurement procedure is used to identify a channel performance metric indicating one or more of a RSSI, a RSRQ, a RSRP, a SNR, a SINR, a throughput, and/or an error rate.

The transmission occasion manager 1330 may receive a set of SSBs within a transmission occasion, where the channel measurement procedure is based on the set of SSBs received within the transmission occasion. In some examples, the transmission occasion manager 1330 may receive the one or more SSBs over a set of transmission occasions, where the channel measurement procedure is based on the one or more SSBs received over the set of transmission occasions.

The timing function manager 1335 may update one or more of a timing tracking function or a frequency tracking function, based on the one or more SSBs broadcast by the cells in the notification zone.

The SFN identifier manager 1340 may receive a signal carrying configuration of SSBs broadcast by the cells in the notification zone. In some cases, the signal includes a system information signal or a RRC message. In some cases, the signal indicates one or more of a frequency parameter for the SFN, a time parameter for transmission of the one or more SSBs, a periodicity parameter for transmission of the one or more SSBs, or a numerology parameter for the one or more SSBs.

The SFN support manager 1345 may transmit a first signal indicating that the UE supports the SFN for the notification zone. In some examples, the SFN support manager 1345 may receive, based on the first signal, a second signal indicating that the SFN for the notification zone is configured for the UE. In some examples, the SFN support manager 1345 may receive a signal indicating that a network entity supports the SFN for the notification zone.

The cell-specific SSB manager 1350 may receive one or more cell-specific SSBs from one or more cells of the set of cells. In some examples, the cell-specific SSB manager 1350 may identify a resource mapping identifying resources for the one or more SSBs broadcast over the SFN and resources for the one or more cell-specific SSBs. In some cases, the resource mapping includes a cell-specific bitmap.

The SFN numerology manager 1355 may identify a number associated with the one or more SSBs based on a number associated with one or more cell-specific SSBs for the set of cells, on a configuration signal received by the UE, or on a number associated with a notification zone SFN paging occasion.

The SFN periodicity manager 1360 may identify a periodicity associated with the one or more SSBs based on a periodicity associated with one or more cell-specific SSBs for the set of cells or on a configuration signal received by the UE.

Figure 14:
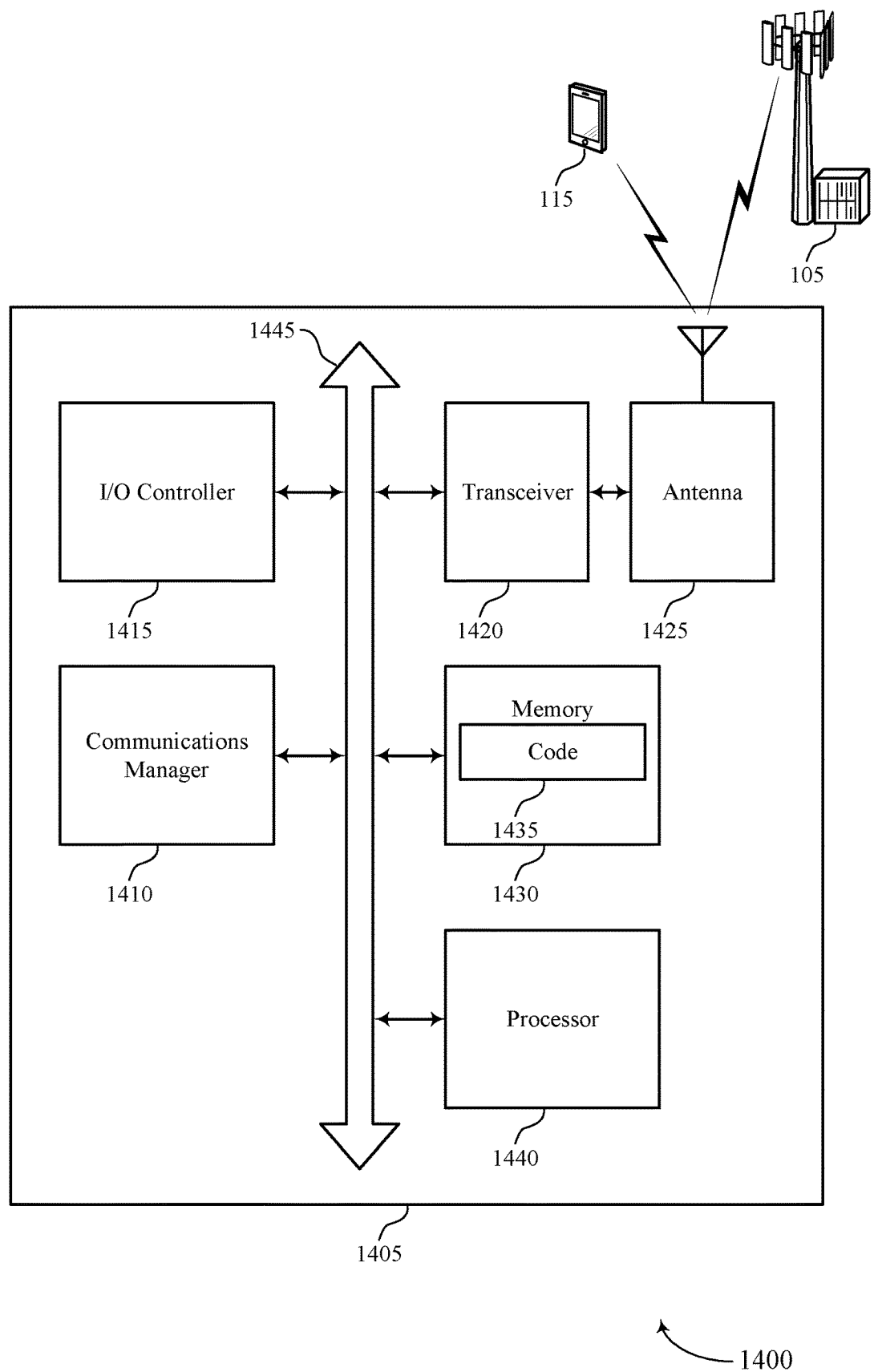
FIG. 14 shows a diagram of a system including a device that supports multi-cell notification zone SFN in accordance with aspects of the present disclosure.

FIG. 14 shows a diagram of a system 1400 including a device 1405 that supports multi-cell notification zone SFN in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

The communications manager 1410 may operate in a RRC inactive state of a DRX mode, identify, based on the UE operating in the RRC inactive state, a SFN for a notification zone that is configured for the UE, the notification zone including a set of cells, receive one or more SSBs broadcast by the set of cells over the SFN, and perform a channel measurement procedure based on the one or more SSBs received over the SFN.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM and ROM. The memory 1430 may store computer-readable, computer-executable code 1435 including instructions that, when executed, cause the processor to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting multi-cell notification zone SFN).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
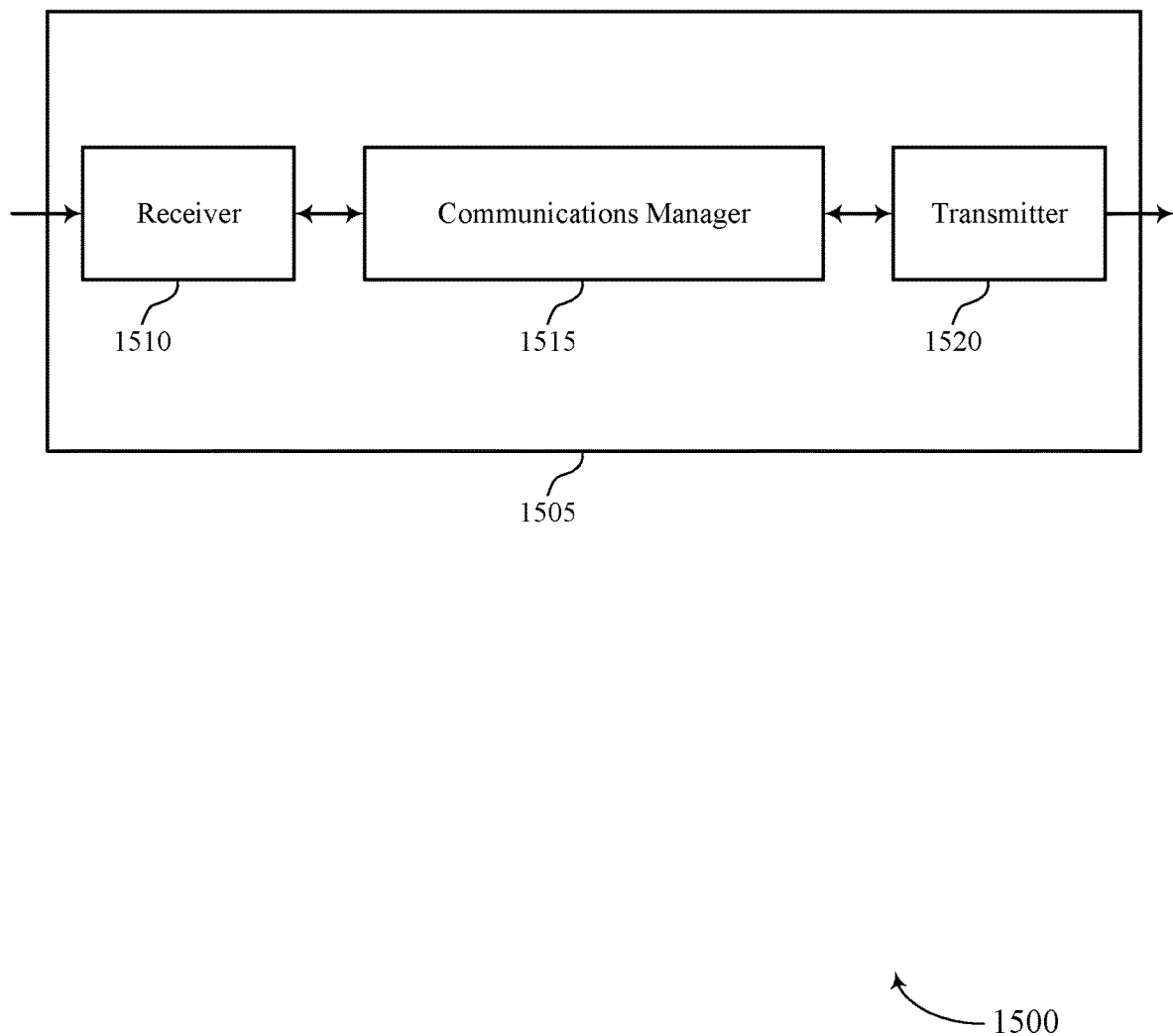
FIGS. 15 and 16 show block diagrams of devices that support multi-cell notification zone SFN in accordance with aspects of the present disclosure.

FIG. 15 shows a block diagram 1500 of a device 1505 that supports multi-cell notification zone SFN in accordance with aspects of the present disclosure. The device 1505 may be an example of aspects of a base station 105 as described herein. The device 1505 may include a receiver 1510, a communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to multi-cell notification zone SFN, etc.). Information may be passed on to other components of the device 1505. The receiver 1510 may be an example of aspects of the transceiver 1820 described with reference to FIG. 18. The receiver 1510 may utilize a single antenna or a set of antennas.

The communications manager 1515 may transmit one or more cell-specific SSBs to a UE, determine that the base station is a part of a SFN for a notification zone configured for the UE, and transmit one or more SSBS to the UE over the SFN for the notification zone. The communications manager 1515 may be an example of aspects of the communications manager 1810 described herein.

The communications manager 1515, or its sub-components, may be implemented in hardware, code (e.g., software or firmware) executed by a processor, or any combination thereof. If implemented in code executed by a processor, the functions of the communications manager 1515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1515, or its sub-components, may be physically located at various positions, including being distributed such that portions of functions are implemented at different physical locations by one or more physical components. In some examples, the communications manager 1515, or its sub-components, may be a separate and distinct component in accordance with various aspects of the present disclosure. In some examples, the communications manager 1515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1820 described with reference to FIG. 18. The transmitter 1520 may utilize a single antenna or a set of antennas.

Figure 16:
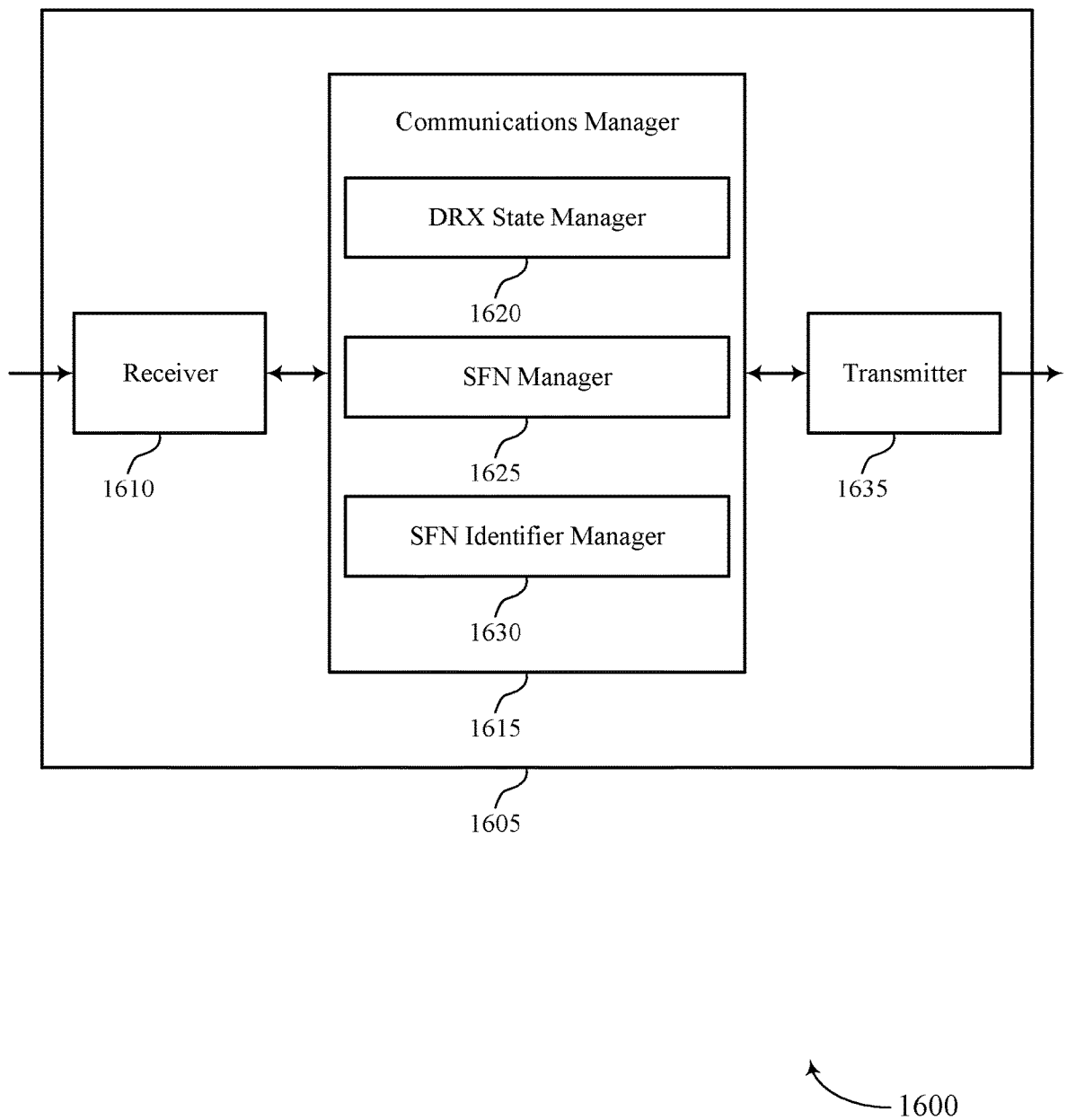

FIG. 16 shows a block diagram 1600 of a device 1605 that supports multi-cell notification zone SFN in accordance with aspects of the present disclosure. The device 1605 may be an example of aspects of a device 1505 or a base station 105 as described herein. The device 1605 may include a receiver 1610, a communications manager 1615, and a transmitter 1635. The device 1605 may also include a processor. Each of these components may be in communication with one another (e.g., via one or more buses).

The receiver 1610 may receive information such as packets, user data, or control information associated with various information channels (e.g., control channels, data channels, and information related to multi-cell notification zone SFN, etc.). Information may be passed on to other components of the device 1605. The receiver 1610 may be an example of aspects of the transceiver 1820 described with reference to FIG. 18. The receiver 1610 may utilize a single antenna or a set of antennas.

The communications manager 1615 may be an example of aspects of the communications manager 1515 as described herein. The communications manager 1615 may include a cell-specific SSB manager 1620, a SFN manager 1625, and a SSB manager 1630. The communications manager 1615 may be an example of aspects of the communications manager 1810 described herein.

The cell-specific SSB manager 1620 may transmit one or more cell-specific SSBs to a UE.

The SFN manager 1625 may determine that the base station is a part of a SFN for a notification zone configured for the UE.

The SSB manager 1630 may transmit one or more SSBS to the UE over the SFN for the notification zone.

The transmitter 1635 may transmit signals generated by other components of the device 1605. In some examples, the transmitter 1635 may be collocated with a receiver 1610 in a transceiver module. For example, the transmitter 1635 may be an example of aspects of the transceiver 1820 described with reference to FIG. 18. The transmitter 1635 may utilize a single antenna or a set of antennas.

Figure 17:
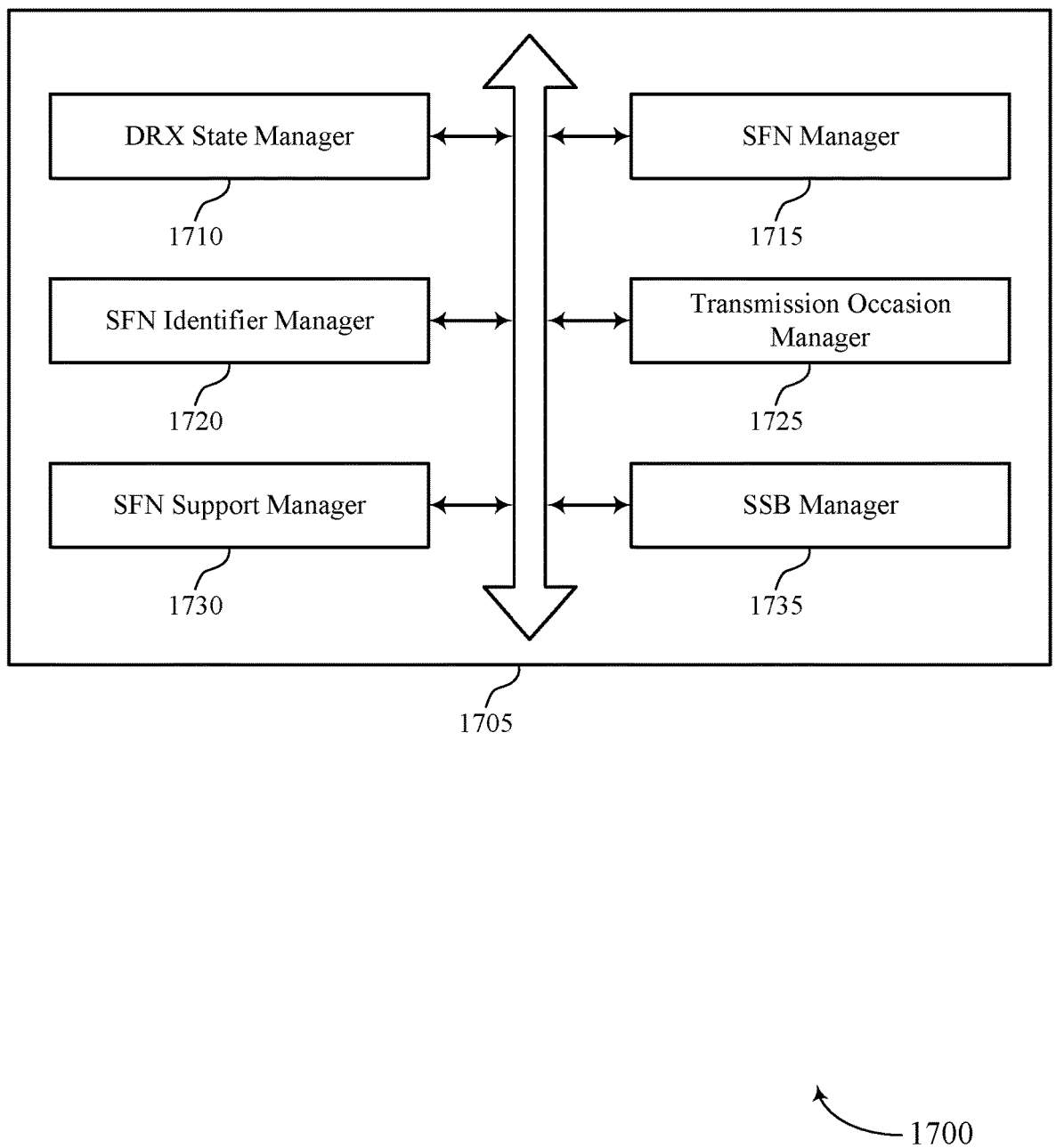
FIG. 17 shows a block diagram of a communications manager that supports multi-cell notification zone SFN in accordance with aspects of the present disclosure.

FIG. 17 shows a block diagram 1700 of a communications manager 1705 that supports multi-cell notification zone SFN in accordance with aspects of the present disclosure. The communications manager 1705 may be an example of aspects of a communications manager 1515, a communications manager 1615, or a communications manager 1810 described herein. The communications manager 1705 may include a cell-specific SSB manager 1710, a SFN manager 1715, a SSB manager 1720, a transmission occasion manager 1725, a SFN identifier manager 1730, a SFN support manager 1735, and a DRX state manager 1740. Each of these modules may communicate, directly or indirectly, with one another (e.g., via one or more buses).

The cell-specific SSB manager 1710 may transmit one or more cell-specific SSBs to a UE. In some examples, the cell-specific SSB manager 1710 may transmit a resource mapping to the UE identifying resources for the one or more SSBs broadcast over the SFN and resources for the one or more cell-specific SSBs. In some examples, the cell-specific SSB manager 1710 may where the resource mapping identifies resource for the one or more SSBs broadcast over the SFN that do not overlap with the resource for the one or more cell-specific SSBs. In some cases, the resource mapping identifies resource for the one or more SSBs broadcast over the SFN that at least partially overlap with the resource for the one or more cell-specific SSBs.

The SFN manager 1715 may determine that the base station is a part of a SFN for a notification zone configured for the UE.

The SSB manager 1720 may transmit one or more SSBS to the UE over the SFN for the notification zone. In some examples, the SSB manager 1720 may encode the SSS to convey an indication of an identifier for the notification zone. In some examples, the SSB manager 1720 may configure a PSS associated with the SSS to indicate a defined identifier that is different from the identifier for the notification zone. In some examples, the SSB manager 1720 may encode the PSS and the SSS to convey an indication of an identifier for the notification zone. In some examples, the SSB manager 1720 may transmit the one or more SSBs broadcast over the network using a same waveform as is used for the one or more cell-specific SSBs. In some examples, the SSB manager 1720 may transmit the one or more SSBs broadcast over the network using a different waveform as is used for the one or more cell-specific SSBs. In some examples, the SSB manager 1720 may identify a number associated with the one or more SSBs based on a number associated with the one or more cell-specific SSBs, on a configuration signal transmitted to the UE, or on a number associated with a notification zone SFN paging occasion.

In some examples, the SSB manager 1720 may identify a periodicity associated with the one or more SSBs based on a periodicity associated with the one or more cell-specific SSBs or on a configuration signal transmitted to the UE. In some cases, the one or more SSBs are transmitted on a non-synchronized raster with respect to the one or more cell-specific SSBs. In some cases, the one or more SSBs include one or more of a PSS, a SSS, and/or a PBCH signal. In some cases, the one or more SSBs include a PBCH signal indicating notification zone specific configuration information.

The transmission occasion manager 1725 may transmit, over the SFN, a set of SSBs within a transmission occasion. In some examples, the transmission occasion manager 1725 may transmit, over the SFN, one or more SSBs over a set of transmission occasions.

The SFN identifier manager 1730 may transmit a signal to the UE identifying the SFN for the notification zone. In some cases, the signal indicates one or more of a frequency parameter for the SFN, a time parameter for transmission of the one or more SSBs, a periodicity parameter for transmission of the one or more SSBs, or a numerology parameter for the one or more SSBs.

The SFN support manager 1735 may receive a first signal indicating that the UE supports the SFN for the notification zone. In some examples, the SFN support manager 1735 may transmit, based on the first signal, a second signal indicating that the SFN for the notification zone is configured for the UE. In some examples, the SFN support manager 1735 may transmit a second signal indicating support for the SFN for the notification zone.

The DRX state manager 1740 may determine that the UE is operating in a RRC inactive state of a DRX mode. In some examples, the DRX state manager 1740 may configure, based on the UE operating in the RRC inactive state, the SFN for the UE for the notification zone, the notification zone including a set of cells.

Figure 18:
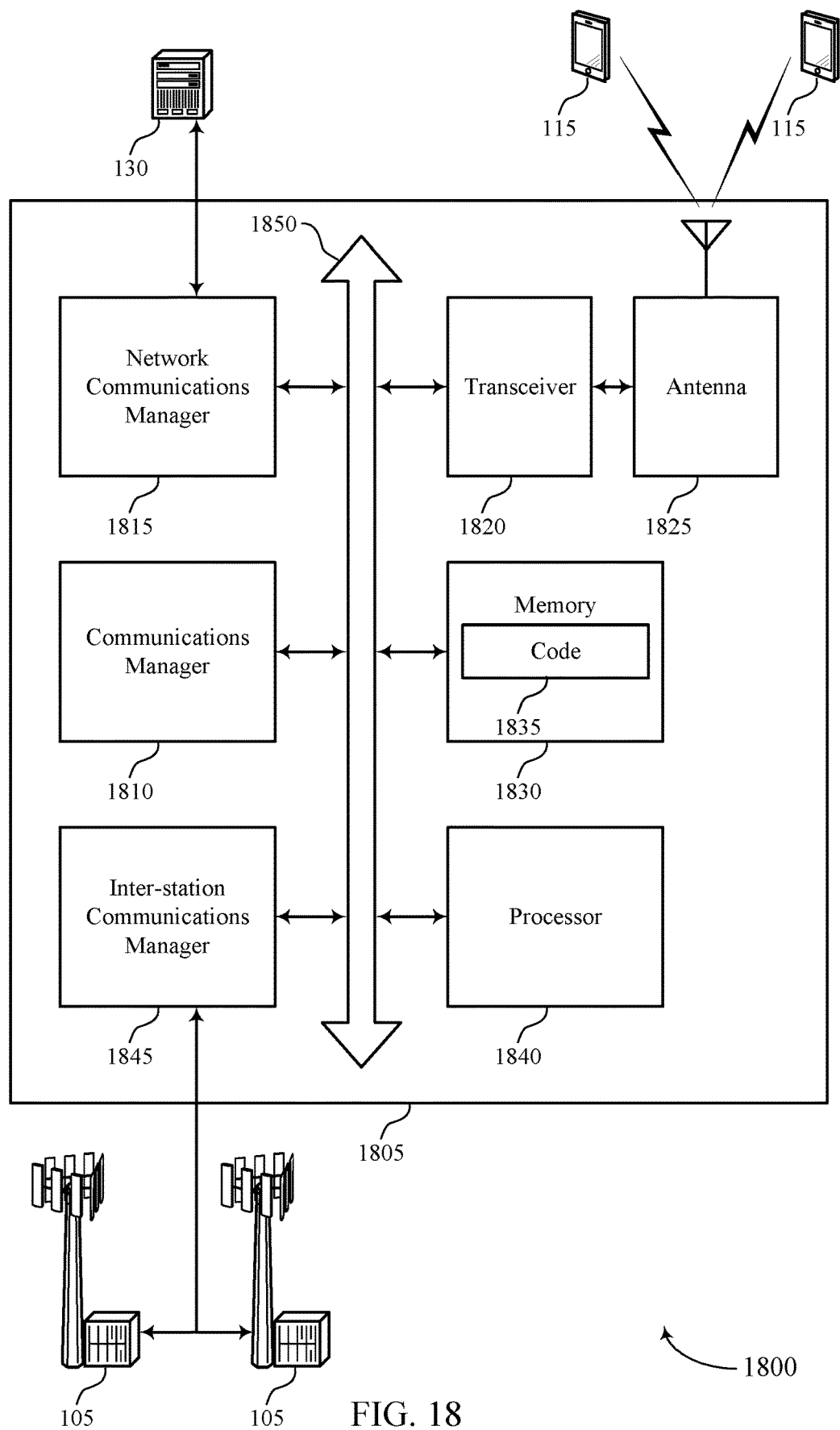
FIG. 18 shows a diagram of a system including a device that supports multi-cell notification zone SFN in accordance with aspects of the present disclosure.

FIG. 18 shows a diagram of a system 1800 including a device 1805 that supports multi-cell notification zone SFN in accordance with aspects of the present disclosure. The device 1805 may be an example of or include the components of device 1505, device 1605, or a base station 105 as described herein. The device 1805 may include components for bi-directional voice and data communications including components for transmitting and receiving communications, including a communications manager 1810, a network communications manager 1815, a transceiver 1820, an antenna 1825, memory 1830, a processor 1840, and an inter-station communications manager 1845. These components may be in electronic communication via one or more buses (e.g., bus 1850).

The communications manager 1810 may transmit one or more cell-specific SSBs to a UE, determine that the base station is a part of a SFN for a notification zone configured for the UE, and transmit one or more SSBS to the UE over the SFN for the notification zone.

The network communications manager 1815 may manage communications with the core network (e.g., via one or more wired backhaul links). For example, the network communications manager 1815 may manage the transfer of data communications for client devices, such as one or more UEs 115.

The transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device may include a single antenna 1825. However, in some cases the device may have more than one antenna 1825, which may be capable of concurrently transmitting or receiving multiple wireless transmissions.

The memory 1830 may include RAM, ROM, or a combination thereof. The memory 1830 may store computer-readable code 1835 including instructions that, when executed by a processor (e.g., the processor 1840) cause the device to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some cases, a memory controller may be integrated into processor 1840. The processor 1840 may be configured to execute computer-readable instructions stored in a memory (e.g., the memory 1830) to cause the device #{device} to perform various functions (e.g., functions or tasks supporting multi-cell notification zone SFN).

The inter-station communications manager 1845 may manage communications with other base station 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communication network technology to provide communication between base stations 105.

The code 1835 may include instructions to implement aspects of the present disclosure, including instructions to support wireless communications. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

Figure 19:
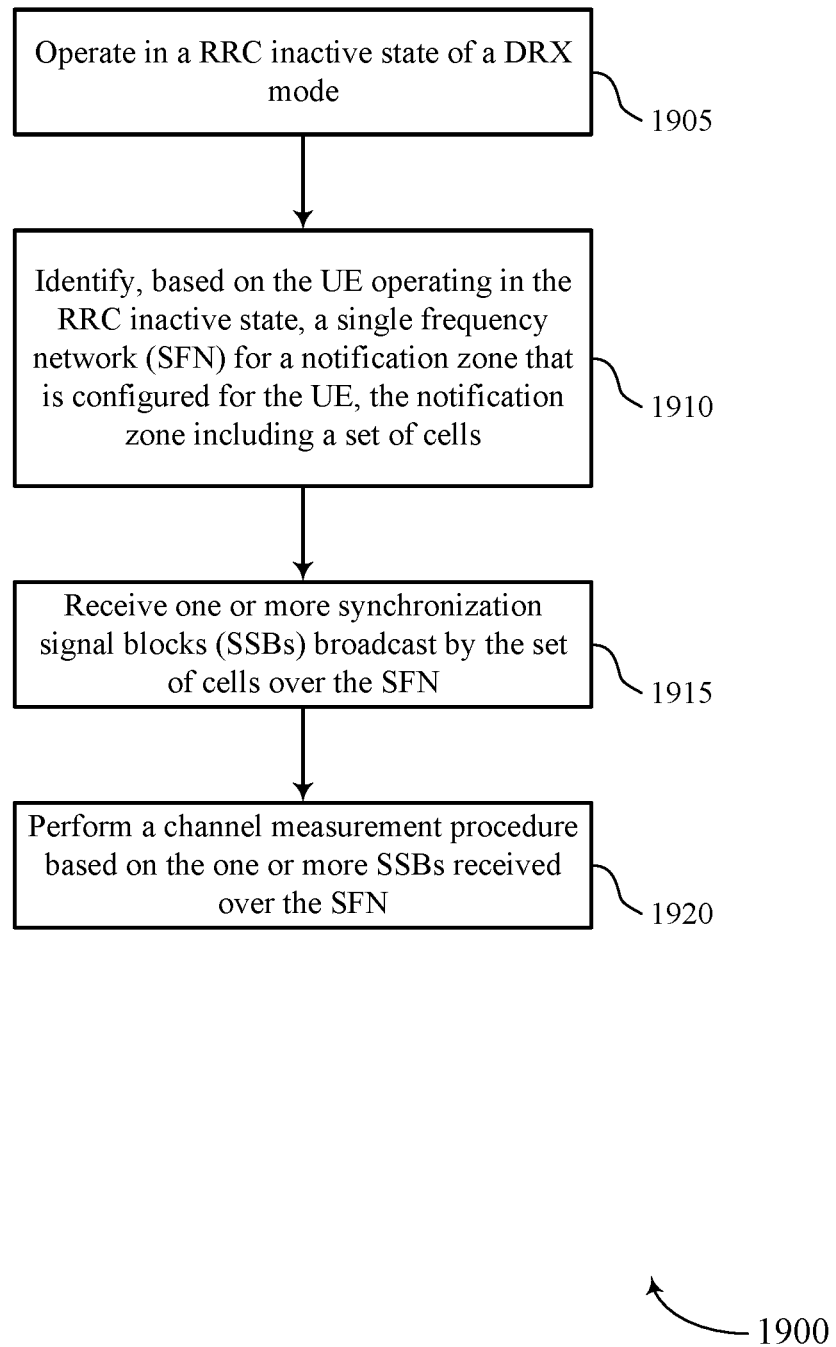
FIGS. 19 through 22 show flowcharts illustrating methods that support multi-cell notification zone SFN in accordance with aspects of the present disclosure.

FIG. 19 shows a flowchart illustrating a method 1900 that supports multi-cell notification zone SFN in accordance with aspects of the present disclosure. The operations of method 1900 may be implemented by a UE 115 or its components as described herein. For example, the operations of method 1900 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 1905, the UE may operate in a RRC inactive state of a DRX mode. The operations of 1905 may be performed according to the methods described herein. In some examples, aspects of the operations of 1905 may be performed by a DRX state manager as described with reference to FIGS. 11 through 14.

At 1910, the UE may identify, based on the UE operating in the RRC inactive state, a SFN for a notification zone that is configured for the UE, the notification zone including a set of cells. The operations of 1910 may be performed according to the methods described herein. In some examples, aspects of the operations of 1910 may be performed by a SFN manager as described with reference to FIGS. 11 through 14.

At 1915, the UE may receive one or more SSBs broadcast by the set of cells over the SFN. The operations of 1915 may be performed according to the methods described herein. In some examples, aspects of the operations of 1915 may be performed by a SSB manager as described with reference to FIGS. 11 through 14.

At 1920, the UE may perform a channel measurement procedure based on the one or more SSBs received over the SFN. The operations of 1920 may be performed according to the methods described herein. In some examples, aspects of the operations of 1920 may be performed by a channel measurement manager as described with reference to FIGS. 11 through 14.

Figure 20:
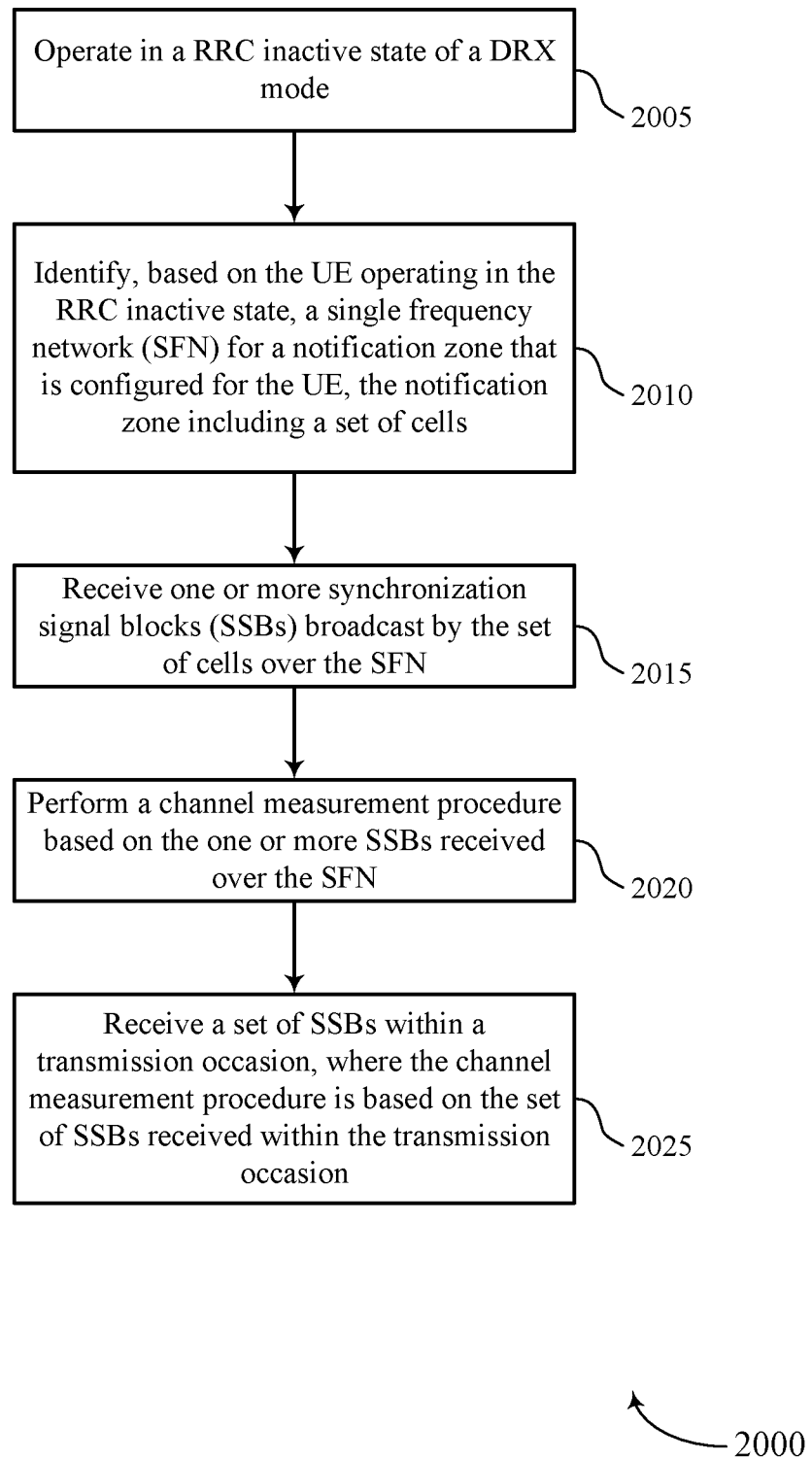

FIG. 20 shows a flowchart illustrating a method 2000 that supports multi-cell notification zone SFN in accordance with aspects of the present disclosure. The operations of method 2000 may be implemented by a UE 115 or its components as described herein. For example, the operations of method 2000 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 2005, the UE may operate in a RRC inactive state of a DRX mode. The operations of 2005 may be performed according to the methods described herein. In some examples, aspects of the operations of 2005 may be performed by a DRX state manager as described with reference to FIGS. 11 through 14.

At 2010, the UE may identify, based on the UE operating in the RRC inactive state, a SFN for a notification zone that is configured for the UE, the notification zone including a set of cells. The operations of 2010 may be performed according to the methods described herein. In some examples, aspects of the operations of 2010 may be performed by a SFN manager as described with reference to FIGS. 11 through 14.

At 2015, the UE may receive one or more SSBs broadcast by the set of cells over the SFN. The operations of 2015 may be performed according to the methods described herein. In some examples, aspects of the operations of 2015 may be performed by a SSB manager as described with reference to FIGS. 11 through 14.

At 2020, the UE may perform a channel measurement procedure based on the one or more SSBs received over the SFN. The operations of 2020 may be performed according to the methods described herein. In some examples, aspects of the operations of 2020 may be performed by a channel measurement manager as described with reference to FIGS. 11 through 14.

At 2025, the UE may receive a set of SSBs within a transmission occasion, where the channel measurement procedure is based on the set of SSBs received within the transmission occasion. The operations of 2025 may be performed according to the methods described herein. In some examples, aspects of the operations of 2025 may be performed by a transmission occasion manager as described with reference to FIGS. 11 through 14.

Figure 21:
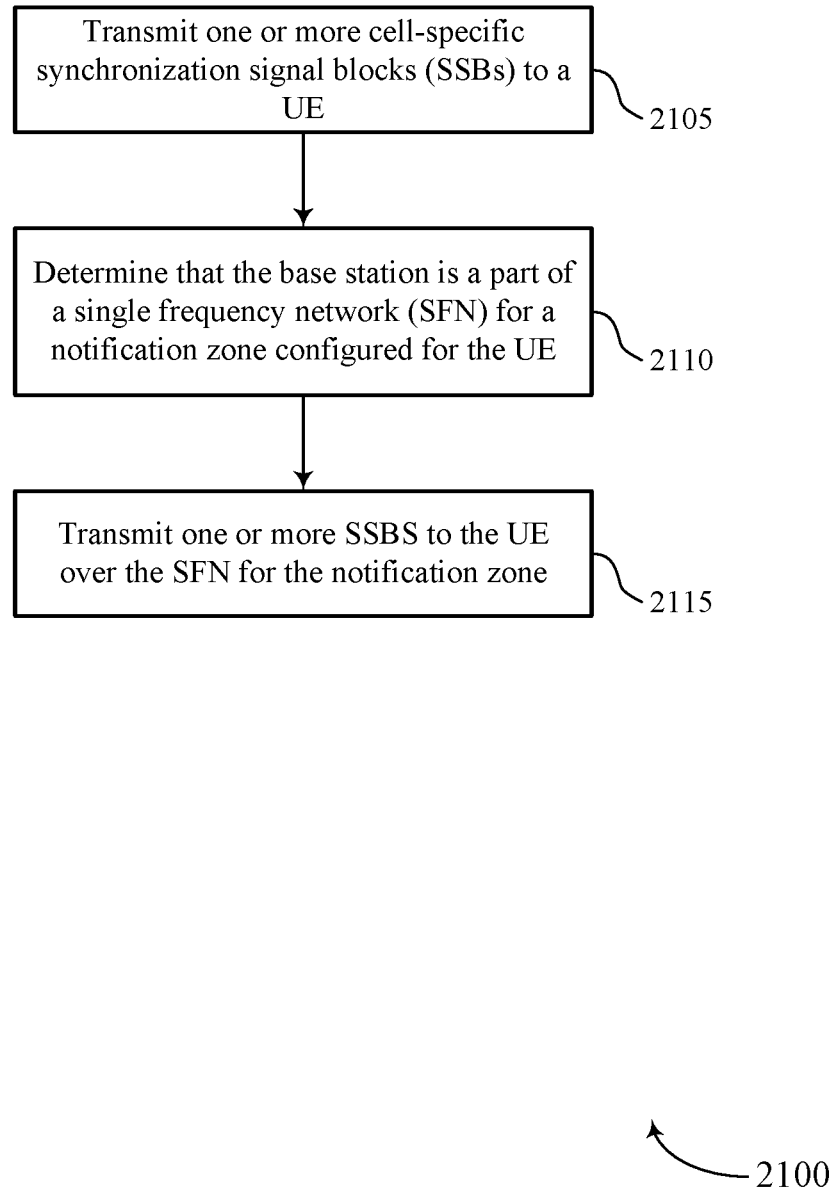

FIG. 21 shows a flowchart illustrating a method 2100 that supports multi-cell notification zone SFN in accordance with aspects of the present disclosure. The operations of method 2100 may be implemented by a base station 105 or its components as described herein. For example, the operations of method 2100 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 2105, the base station may transmit one or more cell-specific SSBs to a UE. The operations of 2105 may be performed according to the methods described herein. In some examples, aspects of the operations of 2105 may be performed by a cell-specific SSB manager as described with reference to FIGS. 15 through 18.

At 2110, the base station may determine that the base station is a part of a SFN for a notification zone configured for the UE. The operations of 2110 may be performed according to the methods described herein. In some examples, aspects of the operations of 2110 may be performed by a SFN manager as described with reference to FIGS. 15 through 18.

At 2115, the base station may transmit one or more SSBS to the UE over the SFN for the notification zone. The operations of 2115 may be performed according to the methods described herein. In some examples, aspects of the operations of 2115 may be performed by a SSB manager as described with reference to FIGS. 15 through 18.

Figure 22:
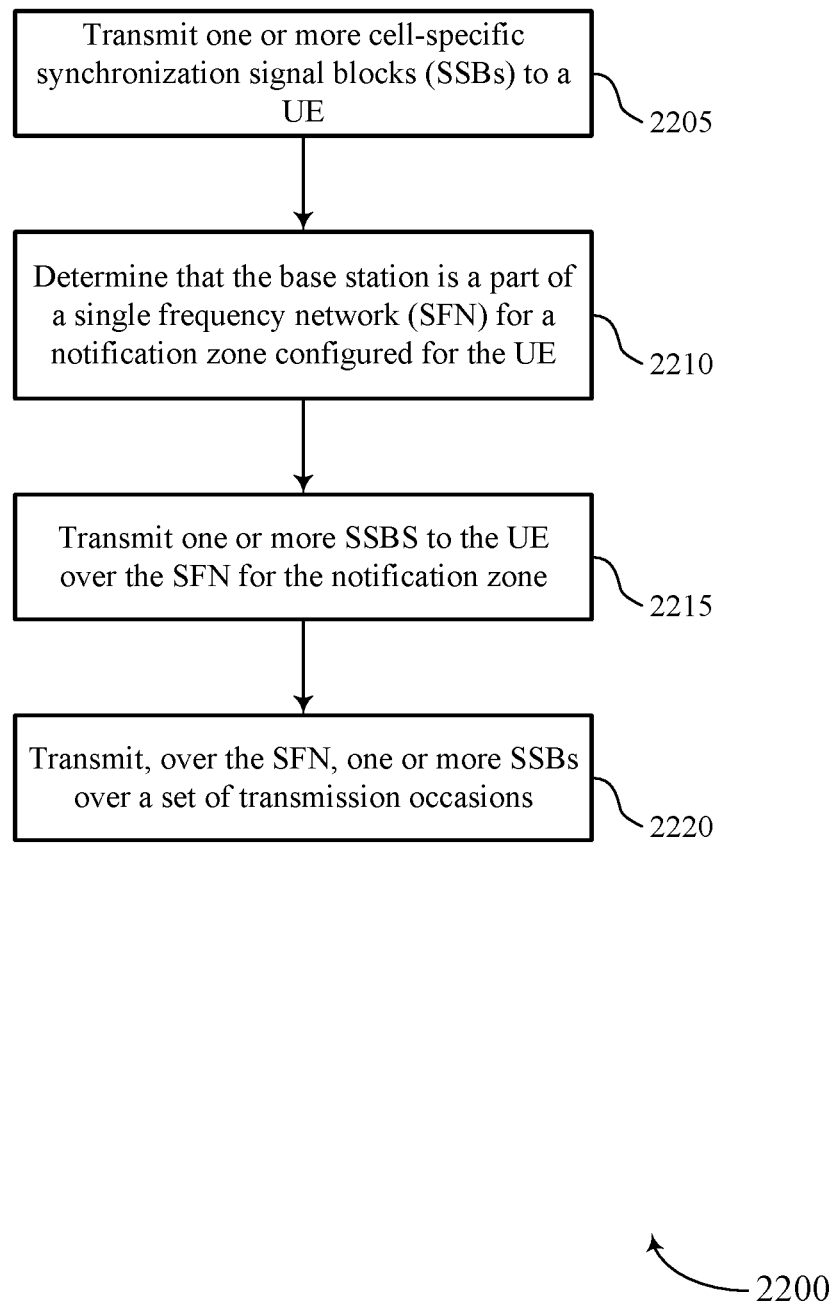

FIG. 22 shows a flowchart illustrating a method 2200 that supports multi-cell notification zone SFN in accordance with aspects of the present disclosure. The operations of method 2200 may be implemented by a base station 105 or its components as described herein. For example, the operations of method 2200 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 2205, the base station may transmit one or more cell-specific SSBs to a UE. The operations of 2205 may be performed according to the methods described herein. In some examples, aspects of the operations of 2205 may be performed by a cell-specific SSB manager as described with reference to FIGS. 15 through 18.

At 2210, the base station may determine that the base station is a part of a SFN for a notification zone configured for the UE. The operations of 2210 may be performed according to the methods described herein. In some examples, aspects of the operations of 2210 may be performed by a SFN manager as described with reference to FIGS. 15 through 18.

At 2215, the base station may transmit one or more SSBS to the UE over the SFN for the notification zone. The operations of 2215 may be performed according to the methods described herein. In some examples, aspects of the operations of 2215 may be performed by a SSB manager as described with reference to FIGS. 15 through 18.

At 2220, the base station may transmit, over the SFN, one or more SSBs over a set of transmission occasions. The operations of 2220 may be performed according to the methods described herein. In some examples, aspects of the operations of 2220 may be performed by a transmission occasion manager as described with reference to FIGS. 15 through 18.

It should be noted that the methods described above describe possible implementations, and that the operations and the steps may be rearranged or otherwise modified and that other implementations are possible. Further, aspects from two or more of the methods may be combined.

Aspects of the following examples may be combined with any of the previous embodiments or aspects described herein. Thus, example 1 is a method for wireless communication at a UE, including: operating in a RRC inactive state of a DRX mode; identifying, based at least in part on the UE operating in the RRC inactive state, a SFN for a notification zone that is configured for the UE, the notification zone comprising a plurality of cells; receiving one or more SSBs broadcast by the plurality of cells over the SFN; and performing a channel measurement procedure based at least in part on the one or more SSBs received over the SFN.

In example 2, the method of example 1 may include receiving a plurality of SSBs within a transmission occasion, wherein the channel measurement procedure is based at least in part on the plurality of SSBs received within the transmission occasion.

In example 3, the method of examples 1-2 may include receiving the one or more SSBs over a plurality of transmission occasions, wherein the channel measurement procedure is based at least in part on the one or more SSBs received over the plurality of transmission occasions.

In example 4, the method of examples 1-3 may include updating one or more of a timing tracking function or a frequency tracking function, based at least in part on the one or more SSBs broadcast by the cells in the notification zone.

In example 5, the method of examples 1-4 may include receiving a carrying configuration of SSBs broadcast by the cells in the notification zone.

In example 6, the method of examples 1-5 may include the signal comprising a system information signal or a RRC message.

In example 7, the method of examples 1-6 may include the signal indicating one or more of a frequency parameter for the SFN, a time parameter for transmission of the one or more SSBs, a periodicity parameter for transmission of the one or more SSBs, or a numerology parameter for the one or more SSBs.

In example 8, the method of examples 1-7 may include transmitting a first signal indicating that the UE supports the SFN for the notification zone.

In example 9, the method of examples 1-8 may include receiving, based at least in part on the first signal, a second signal indicating that the SFN for the notification zone is configured for the UE.

In example 10, the method of examples 1-9 may include receiving a signal indicating that a network entity supports the SFN for the notification zone.

In example 11, the method of examples 1-10 may include receiving one or more cell-specific SSBs from one or more cells of the plurality of cells.

In example 12, the method of examples 1-11 may include identifying a resource mapping identifying resources for the one or more SSBs broadcast over the SFN and resources for the one or more cell-specific SSBs.

In example 13, the method of examples 1-12 may include the resource mapping comprises a cell-specific bitmap.

In example 14, the method of examples 1-13 may include the one or more SSBs comprise a SSS, further comprising: decoding the SSS to determine an identifier for the notification zone.

In example 15, the method of examples 1-14 may include a PSS associated with the SSS comprises a defined identifier that is different from the identifier for the notification zone.

In example 16, the method of examples 1-15 may include the one or more SSBs comprise a PSS and a SSS, further comprising: decoding the PSS and the SSS to determine an identifier for the notification zone.

In example 17, the method of examples 1-16 may include the one or more SSBs are received on a non-synchronized raster with respect to one or more cell-specific SSBs from the plurality of cells.

In example 18, the method of examples 1-17 may include identifying a number associated with the one or more SSBs based at least in part on a number associated with one or more cell-specific SSBs for the plurality of cells, on a configuration signal received by the UE, or on a number associated with a notification zone SFN paging occasion.

In example 19, the method of examples 1-18 may include identifying a periodicity associated with the one or more SSBs based at least in part on a periodicity associated with one or more cell-specific SSBs for the plurality of cells or on a configuration signal received by the UE.

In example 20, the method of examples 1-19 may include the one or more SSBs comprise one or more of a PSS, a SSS, or a PBCH signal.

In example 21, the method of examples 1-20 may include the channel measurement procedure is used to identify a channel performance metric indicating one or more of a RSSI, a RSRQ, a RSRP, a SNR, a SINR, a throughput, or an error rate.

In example 22, the method of examples 1-21 may include the one or more SSBs comprising a PBCH signal indicating notification zone specific configuration information.

Example 23 is a method for wireless communication at a base station, including: transmitting one or more cell-specific SSBs to a user UE; determining that the base station is a part of a SFN for a notification zone configured for the UE; and transmitting one or more SSBS to the UE over the SFN for the notification zone.

In example 24, the method of example 23 may include transmitting, over the SFN, a plurality of SSBs within a transmission occasion.

In example 25, the method of examples 23-24 may include transmitting, over the SFN, one or more SSBs over a plurality of transmission occasions.

In example 26, the method of examples 23-25 may include transmitting a signal to the UE identifying the SFN for the notification zone.

In example 27, the method of examples 23-26 may include the signal indicating one or more of a frequency parameter for the SFN, a time parameter for transmission of the one or more SSBs, a periodicity parameter for transmission of the one or more SSBs, or a numerology parameter for the one or more SSBs.

In example 28, the method of examples 23-27 may include receiving a first signal indicating that the UE supports the SFN for the notification zone.

In example 29, the method of examples 23-28 may include transmitting, based at least in part on the first signal, a second signal indicating that the SFN for the notification zone is configured for the UE.

In example 30, the method of examples 23-29 may include transmitting a second signal indicating support for the SFN for the notification zone.

In example 31, the method of examples 23-30 may include transmitting a resource mapping to the UE identifying resources for the one or more SSBs broadcast over the SFN and resources for the one or more cell-specific SSBs.

In example 32, the method of examples 23-31 may include the resource mapping identifies resource for the one or more SSBs broadcast over the SFN that at least partially overlap with the resource for the one or more cell-specific SSBs.

In example 33, the method of examples 23-32 may include wherein the resource mapping identifies resource for the one or more SSBs broadcast over the SFN that do not overlap with the resource for the one or more cell-specific SSBs.

In example 34, the method of examples 23-33 may include the one or more SSBs comprise a SSS, further comprising: encoding the SSS to convey an indication of an identifier for the notification zone.

In example 35, the method of examples 23-34 may include configuring a PSS associated with the SSS to indicate a defined identifier that is different from the identifier for the notification zone.

In example 36, the method of examples 23-35 may include the one or more SSBs comprising a SSS and a PSS, further comprising: encoding the PSS and the SSS to convey an indication of an identifier for the notification zone.

In example 37, the method of examples 23-36 may include transmitting the one or more SSBs broadcast over the network using a same waveform as is used for the one or more cell-specific SSBs.

In example 38, the method of examples 23-37 may include transmitting the one or more SSBs broadcast over the network using a different waveform as is used for the one or more cell-specific SSBs.

In example 39, the method of examples 23-38 may include the one or more SSBs are transmitted on a non-synchronized raster with respect to the one or more cell-specific SSBs.

In example 40, the method of examples 23-39 may include identifying a number associated with the one or more SSBs based at least in part on a number associated with the one or more cell-specific SSBs, on a configuration signal transmitted to the UE, or on a number associated with a notification zone SFN paging occasion.

In example 41, the method of examples 23-40 may include identifying a periodicity associated with the one or more SSBs based at least in part on a periodicity associated with the one or more cell-specific SSBs or on a configuration signal transmitted to the UE.

In example 42, the method of examples 23-41 may include the one or more SSBs comprise one or more of a PSS, a SSS, or a PBCH signal.

In example 43, the method of examples 23-42 may include determining that the UE is operating in a RRC inactive state of a DRX mode; and configuring, based at least in part on the UE operating in the RRC inactive state, the SFN for the UE for the notification zone, the notification zone comprising a plurality of cells.

In example 44, the method of examples 23-43 may include the one or more SSBs comprising a PBCH signal indicating notification zone specific configuration information.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    operating in a radio resource control (RRC) inactive state of a discontinuous reception (DRX) mode;
    identifying, based at least in part on the UE operating in the RRC inactive state, a single frequency network (SFN) for a notification zone that is configured for the UE, the notification zone comprising a plurality of cells;
    receiving one or more cell-specific synchronization signal blocks (SSBs) from one or more cells of the plurality of cells;
    receiving one or more SSBs broadcast by the plurality of cells over the SFN; and
    performing a channel measurement procedure based at least in part on the one or more SSBs received over the SFN.

2. The method of claim 1, further comprising:
    receiving the one or more SSBs broadcast by the plurality of cells within the zone over the SFN, wherein the channel measurement procedure is based at least in part on the one or more SSBs received over the plurality of cells within the zone.

3. The method of claim 1, further comprising:
    updating one or more of a timing tracking function or a frequency tracking function, based at least in part on the one or more SSBs broadcast by the cells within the notification zone.

4. The method of claim 1, further comprising:
    receiving a signal carrying configuration of SSBs broadcast by the cells in the notification zone.

5. The method of claim 4, wherein the signal comprises a system information signal or a RRC message.

6. The method of claim 4, wherein the signal indicates one or more of a frequency parameter for the SFN, a time parameter for transmission of the one or more SSBs, a periodicity parameter for transmission of the one or more SSBs, or a numerology parameter for the one or more SSBs.

7. The method of claim 1, further comprising:
    transmitting a first signal indicating that the UE supports the SFN for the notification zone.

8. The method of claim 7, further comprising:
    receiving, based at least in part on the first signal, a second signal indicating that the SFN for the notification zone is configured for the UE.

9. The method of claim 1, further comprising:
    receiving a signal indicating that a network entity supports the SFN for the notification zone.

10. The method of claim 1, further comprising:
    identifying a resource mapping identifying resources for the one or more SSBs broadcast over the SFN and resources for the one or more cell-specific SSBs.

11. The method of claim 10, wherein the resource mapping comprises a cell-specific bitmap.

12. The method of claim 1, wherein the one or more SSBs comprise a secondary synchronization signal (SSS), further comprising:
    decoding the SSS to determine an identifier for the notification zone.

13. The method of claim 12, wherein a primary synchronization signal (PSS) associated with the SSS comprises a defined identifier that is different from the identifier for the notification zone.

14. The method of claim 1, wherein the one or more SSBs comprise a primary synchronization signal (PSS) and a secondary synchronization signal (SSS), further comprising:
    decoding the PSS and the SSS to determine an identifier for the notification zone.

15. The method of claim 14, wherein the one or more SSBs are received on a non-synchronized raster with respect to the one or more cell-specific SSBs from the plurality of cells.

16. The method of claim 1, further comprising:
    identifying a number associated with the one or more SSBs based at least in part on a number associated with the one or more cell-specific SSBs for the plurality of cells, on a configuration signal received by the UE, or on a number associated with a notification zone SFN paging occasion.

17. The method of claim 1, further comprising:
identifying a periodicity associated with the one or more SSBs based at least in part on a periodicity associated with the one or more cell-specific SSBs for the plurality of cells or on a configuration signal received by the UE.

18. The method of claim 1, wherein the one or more SSBs comprise one or more of a primary synchronization signal (PSS), a secondary synchronization signal (SSS), or a physical broadcast channel (PBCH) signal.

19. The method of claim 1, wherein the channel measurement procedure is used to identify a channel performance metric indicating one or more of a received signal strength indicator (RSSI), a reference signal received quality (RSRQ), a reference signal received power (RSRP), a signal-to-noise ratio (SNR), a signal-plus-interference-to-noise ratio (SINR), a throughput, or an error rate.

20. The method of claim 1, wherein the one or more SSBs comprise a physical broadcast channel (PBCH) signal indicating notification zone specific configuration information.

21. An apparatus for wireless communication at a user equipment (UE), comprising:
a processor, memory in electronic communication with the processor; and
instructions stored in the memory and executable by the processor to cause the apparatus to:
operate in a radio resource control (RRC) inactive state of a discontinuous reception (DRX) mode;
identify, based at least in part on the UE operating in the RRC inactive state, a single frequency network (SFN) for a notification zone that is configured for the UE, the notification zone comprising a plurality of cells;
receive one or more cell-specific synchronization signal blocks (SSBs) from one or more cells of the plurality of cells;
receive one or more SSBs broadcast by the plurality of cells over the SFN; and
perform a channel measurement procedure based at least in part on the one or more SSBs received over the SFN.

* * * * *